(12) United States Patent
Carr et al.

(10) Patent No.: US 12,243,405 B2
(45) Date of Patent: Mar. 4, 2025

(54) SMART TEMPERATURE DETECTION AND ALARM SYSTEM

(71) Applicant: Hearo Technologies, Springfield, MO (US)

(72) Inventors: James Edward Carr, Lebanon, MO (US); Myke Bates, Springfield, MO (US); Tom Rankin, Springfield, MO (US); David Hamilton, Willard, MO (US); Zak Turner, Springfield, MO (US)

(73) Assignee: Hearo Technologies, Springfield, MO (US)

( * ) Notice: Subject to any disclaimer, the term of this patent is extended or adjusted under 35 U.S.C. 154(b) by 144 days.

(21) Appl. No.: 18/162,634

(22) Filed: Jan. 31, 2023

(65) Prior Publication Data

US 2023/0245547 A1    Aug. 3, 2023

Related U.S. Application Data

(60) Provisional application No. 63/305,679, filed on Feb. 1, 2022.

(51) Int. Cl.
*G08B 21/04*    (2006.01)
*G01K 1/024*    (2021.01)
(Continued)

(52) U.S. Cl.
CPC ......... *G08B 21/0484* (2013.01); *G01K 1/024* (2013.01); *G08B 5/38* (2013.01); *G08B 31/00* (2013.01)

(58) Field of Classification Search
CPC ...... G08B 21/0484; G08B 5/38; G08B 31/00; G01K 1/024
(Continued)

(56) References Cited

U.S. PATENT DOCUMENTS 9,389,020 B2 *   7/2016   Ewell .................. F27D 21/04
10,816,944 B2 * 10/2020   Britt .................... H04W 4/80
(Continued)

OTHER PUBLICATIONS

Säter, et al., "IoT in the kitchen: monitoring stovetops for fire safety," Thesis for the Degree of Bachelor of Science in Engineering—Computer Network Engineering, Mälardalen University, School of Innovation, Design and Engineering, Västeras, Sweden, Jun. 9, 2020, 77 pages.
(Continued)

*Primary Examiner* — Kerri L McNally
*Assistant Examiner* — Thang D Tran
(74) *Attorney, Agent, or Firm* — Barta Jones, PLLC

(57) ABSTRACT

Examples provide a temperature-sensitive alert device that monitors temperatures associated with a heating device, such as an oven, stove, or cooktop. The alert device changes the status of the heating device from an off status to an on status if the temperature exceeds a threshold temperature. The alert device initiates an alert if the heating device remains turned on for a period of time which exceeds an expected amount of time. The alert can include an audible sound and/or a visual alert, such as a flashing light. A user can select a snooze function to turn off the alert for an alert delay time without disabling the alert device. When the delay time expires, the alert resumes. The alert device includes a dual component device enabling a first component monitoring a cooktop to synchronize with a second alert device monitoring another heating device, such as a detached oven or stove.

20 Claims, 15 Drawing Sheets

(51) Int. Cl.
*G08B 5/38* (2006.01)
*G08B 31/00* (2006.01)

(58) Field of Classification Search
USPC .......................................................... 340/517
See application file for complete search history.

(56) References Cited

U.S. PATENT DOCUMENTS

| | | | | |
|---|---|---|---|---|
| 10,848,625 | B1* | 11/2020 | Pugh | H04N 1/00814 |
| 2008/0084296 | A1* | 4/2008 | Kutzik | G08B 21/0453 |
| | | | | 340/540 |
| 2013/0229278 | A1* | 9/2013 | Davis | G08B 21/0484 |
| | | | | 340/521 |
| 2015/0118630 | A1* | 4/2015 | Ewell | A47J 31/525 |
| | | | | 432/32 |
| 2015/0137970 | A1 | 5/2015 | Davis | |
| 2016/0195859 | A1* | 7/2016 | Britt | H04W 4/80 |
| | | | | 700/275 |
| 2016/0281995 | A1* | 9/2016 | Taylor | F24C 7/08 |
| 2017/0070890 | A1* | 3/2017 | Luff | H04W 12/106 |
| 2018/0309622 | A1* | 10/2018 | Ilaria | H04L 43/0817 |
| 2019/0113494 | A1* | 4/2019 | Desjardins | G01N 33/0034 |
| 2019/0328598 | A1* | 10/2019 | Mangiardi | H04L 67/12 |
| 2019/0352589 | A1* | 11/2019 | Jing | C12M 41/36 |
| 2019/0355234 | A1* | 11/2019 | Kim | G08C 17/02 |
| 2020/0018654 | A1* | 1/2020 | Seloff | G01K 1/024 |
| 2020/0226892 | A1* | 7/2020 | Coles | G08B 5/38 |
| 2020/0378610 | A1* | 12/2020 | Williams | G05G 1/10 |
| 2021/0112647 | A1* | 4/2021 | Coleman | H05B 45/12 |
| 2021/0256831 | A1 | 8/2021 | Ehrlich et al. | |
| 2021/0288832 | A1 | 9/2021 | Saxena et al. | |
| 2021/0364486 | A1* | 11/2021 | Maurel | G01N 33/0062 |
| 2022/0316730 | A1* | 10/2022 | Hui | F24F 11/32 |
| 2023/0228245 | A1* | 7/2023 | Chen | F03D 9/25 |

OTHER PUBLICATIONS

Yared, et al., "Risk Analysis and Assessment to Enhance Safety in a Smart Kitchen," Fire Technology, 2018 Spring Science+Business Media, LLC, Published online Jan. 12, 2018, 23 pages.

* cited by examiner

Modes of operation:

| Mode | LED | Buzzer |
|---|---|---|
| Waiting | Off | Off |
| Oven On | On | Off |
| Oven On Long Time | Flashing | On |
| Snoozed | On | Off |

*FIG. 14*

SMART TEMPERATURE DETECTION AND ALARM SYSTEM

CROSS-REFERENCE TO RELATED APPLICATION

This application claims priority to U.S. Provisional Patent Application No. 63/305,679, entitled "SMART TEMPERATURE DETECTION AND ALARM SYSTEM," filed on Feb. 1, 2022, the disclosure of which is incorporated herein by reference in its entirety.

BACKGROUND

While utilizing a heating device, such as a stove or cooktop, a user can become distracted or forget that the oven or burner has been left turned on. This issue may be especially prevalent among the elderly and disabled individuals. If left unattended, these devices can cause excessive smoke, result in overcooked food, or even cause a fire. This can lead to injuries to individuals in residences as well as property damage due to the lack of sufficient safety devices and warning systems to remind individuals that may have inadvertently left a stove or other heating device turned on for an extended period of time.

SUMMARY

Some examples provide a temperature-sensitive alert device. The device includes an alert generator that generates an alert indicating a heating device time-on duration exceeding a time-on maximum duration threshold. The alert is de-activated for a user-configurable alert delay time in response to user activation of a snooze button. The alert is re-activated in response to the expiration of the user-configurable alert delay time. A memory is communicatively coupled to a processor that executes computer-executable instructions to analyze historical usage data associated with the snooze button, including number of snooze button activations within a time-period. The time-on maximum duration threshold is updated using the historical usage data. The time-on maximum duration threshold is increased to reduce the number of snooze button activations occurring in future where the historical usage data indicates a frequency of snooze button usage exceeding an expected frequency.

Other examples provide a method for generating temperature-sensitive alerts. A heating device is monitored to determine whether the heating device is turned on. A time-on duration of the heating device is calculated by a timer device. A prediction is made as to whether the time-on duration of the heating device exceeds an expected duration using a time-on maximum duration threshold. An alert trigger is generated by a first temperature-sensitive alert device component in response to the time-on duration exceeding the time-on maximum duration threshold. The alert trigger triggers generation of an alert by a second temperature-sensitive alert device component. The alert trigger triggers at least one of a visible alert and an audible alert. The alert is de-activated for a user-configurable alert delay time in response to user activation of a snooze button. The alert is re-activated in response to the expiration of the user-configurable alert delay time.

Still other examples provide a system for temperature-sensitive alert generation. The system includes a first temperature-sensitive alert device component associated with a first heating device. The first temperature-sensitive alert device component monitoring a device time-on duration of the first heating device. A second temperature-sensitive alert device component is communicatively coupled to the first temperature-sensitive alert device component. The second temperature-sensitive alert device is associated with a second heating device. The first temperature-sensitive alert device includes a first memory communicatively coupled to a first processor that executes computer-executable instructions to compare a first time-on duration of the first heating device with a first time-on maximum duration threshold. A first alert generator generates a first alert if the first heating device time-on duration exceeds the first time-on maximum duration threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 14 is an exemplary table of operation modes for a temperature-sensitive alert device.

Corresponding reference characters indicate corresponding parts throughout the drawings. Any of the figures may be combined into a single example or embodiment.

DETAILED DESCRIPTION

Figure 1:
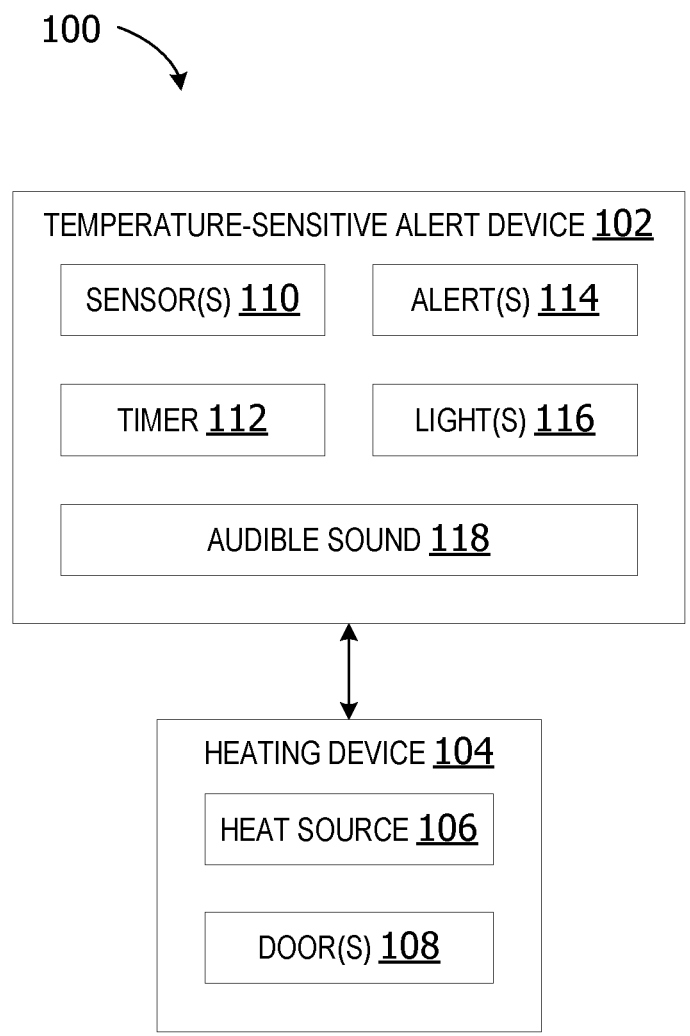
FIG. 1 is an exemplary block diagram illustrating a system for temperature-sensitive smart alarms generated by an alert device.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Ovens and cooktops are common appliances used for cooking and re-heating. Although very useful, these devices can also create a fire hazard or other danger if a user fails to de-activate the device in a timely manner after cooking activities are complete. It can be particularly dangerous for users having physical or cognitive disabilities if an oven or other cooking device is left turned on and unattended due to the danger of fire, smoke, and other related hazards. Some cooktops are currently designed with a red light that activates if the cooktop is hot. However, these lights merely indicate a hot surface and do not alert users if the device is left turned on. An audible alert device can be attached to a knob which periodically emits a beeping sound when the knob is switched to the on position. Although this provides an indication that the device is turned on, the beeping begins immediately after the device is turned on and the beeping continues the entire time the device is on. This constant beeping can be annoying and provides no benefit to users that are currently cooking. Moreover, users become de-sensitized to the continuous beeping, which eventually can be relegated to background noise that is ignored, thereby rending the device useless for its intended purpose.

Some examples provide a temperature-sensitive alert device that compares a heating device time-on duration of a heating device with a time-on maximum duration threshold. An audible alert generator generates an audible alert in response to the heating device time-on duration exceeding the time-on maximum duration threshold. A light emitting diode (LED) light activates in response to the device-on time exceeding the time-on maximum duration threshold. The audible alert is de-activated for a user-configurable alert delay time in response to user activation of a snooze button. The audible alert is re-activated in response to the expiration of the user-configurable alert delay time.

With the growing population of senior citizens and the increasing interest in using technology to improve the independence of individuals with disabilities, there is a growing need for improving the safety of household devices and cooking equipment. Additionally, in the interest of maintaining independence, there is a need for the stove to be able to communicate with external systems in a variety of ways. Thus, the examples recognize that there is a need for an independent source of verification to make sure that stove tops and ovens are indeed turned off.

Referring to the figures, examples of the disclosure enable a temperature-sensitive alert device capable of detecting an on-status of a heating device and initiating an audible and/or visual alert if the heating device remains turned on for longer than expected, indicating the user has likely forgotten to turn the heating device off. In some respects a set of sensors are provided for detecting heat being emitted by the heating device to determine when the heating device is turned on and a timer device for calculating a duration of time during which the heating device is turned on. The temperature-sensitive alert device uses the sensor data to predict whether the heating device is turned on for longer than expected and if so, generate an alert. This provides reminders to users to de-activate potentially dangerous heating devices for increased safety and security.

Other aspects provide an alert delay function which permits a user to stop an alert while permitting the temperature-sensitive alert device to continue monitoring the device on/off status and duration the heating device remains turned on. When the alert delay function is activated, the temperature-sensitive alert device utilizes an extended time-on maximum duration threshold to determine when to generate the alert. This enables a user to delay activation of the alert during long cooking times without de-activating the alert device. This reduces the number of false alarms and improves the user's experience using the alert device.

Still other examples provide a dual alert device composed of two components. This permits the user to mount one component over a cook top and mount another component in proximity to a detached oven or stove for improved flexibility and usability. The dual alert components are synchronized permitting coordinated operation of the alert devices for improved flexibility and scalability of the alert system.

Other aspects provide a machine learning component which analyzes trends in historical usage data to determine frequency of time-delay functions. The historical usage data is used to automatically update threshold values used to activate alerts and/or alert time-delays applied when a user activates a time-delay snooze function to de-activate an alert temporarily. This enables faster and more efficient updating of threshold values for generation of alerts which are customized to the unique situation and preferences of each user.

Referring again to FIG. 1, an exemplary block diagram illustrating a system 100 for temperature-sensitive smart alarms generating by an alert device is shown. The temperature-sensitive alert device 102 is a device which is mounted or secured in proximity to a heating device 104. The heating device 104 is any type of device that provides a heat source 106 for generating heat to cook, re-heat, warm or otherwise heat food or other material. A heating device can include, for example but without limitation, a stove, oven, cook top, hot plate, fryer, toaster oven, or any other type of cooking device. In still other examples, a heating device can also include a space heater, radiator, portable electric heater, iron, or any other heat source 106 device. The heating device 104 can optionally include one or more door(s) 108, such as an oven door, stove door, microwave door, toaster oven door, etc. The one or more door(s) 108 can also include a lid or other top on an oil fryer, air fryer, pressure cooker or other cooking device.

The temperature-sensitive alert device 102 includes one or more sensor(s) 110 for detecting heat generated by the heating device 104. The sensor(s) 110 includes a thermometer, thermocouple, infrared (IR) sensor or any other device that detects heat. In some examples, the sensor(s) 110 include a temperature sensor. When the temperature of the heat generated by the heating device 104 exceeds a minimum device-on temperature threshold, the temperature-sensitive alert device 102 changes the status of the heating device 104 from off-status to on-status.

A timer 112 is a device for measuring an amount of time or duration of time during which the heating device 104 is generating heat (on-status). If the duration of time that the heating device is generating heat exceeds a time-on maximum duration threshold, the temperature-sensitive alert device 102 generates one or more alert(s) 114 to remind the user to turn the heating device 104 off. In some examples, the alert is an audible sound 118, such as a buzzer sound. In other examples, the alert is a visual alert, such as one or more light(s) 116. The light(s) 116 can include a single light or a combination of two or more different colored lights. The visual alert can also include a steady light or a flashing light. In still other examples, the alert is a combination of an audible sound and a visual alert, such as a buzzer sound accompanied by a flashing light.

Figure 2:
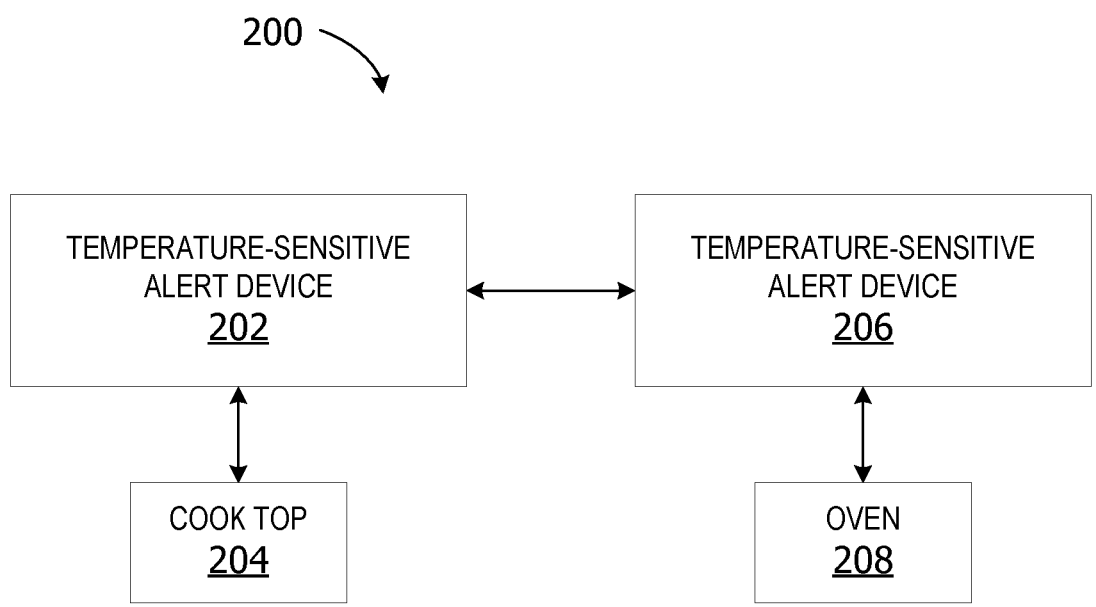
FIG. 2 is an exemplary block diagram illustrating a system for generating alerts via a temperature-sensitive smart alarm device having dual components.

FIG. 2 is an exemplary block diagram illustrating a system 200 for generating alerts via a temperature-sensitive smart alarm device having dual components. In this example, a first temperature-sensitive alert device 202 is mounted in proximity to a cook top 204 to monitor the cook top. A second temperature-sensitive alert device 206 is mounted in proximity to a detached oven 208 to monitor the oven 208. In some examples, the first temperature-sensitive alert device 202 is a device for generating temperature and time-based alerts, such as the temperature-sensitive alert device 102 in FIG. 1. The second temperature-sensitive alert device 206 is another device for generating temperature and time-based alerts, such as the temperature-sensitive alert device 102 in FIG. 1.

However, the examples are not limited to two separate alert devices. In other examples, the first temperature-sensitive alert device 202 and the second temperature-sensitive alert device 206 are components of a single temperature-sensitive alert device. In this example, the first and second temperature-sensitive alert components work in conjunction with each other. In these examples, the devices are calibrated or synchronized together to operate in a coordinated manner such that data generated by one component is shared with the other component. Likewise, input received at one component can influence or control a function of the other component. For example, if a user pushes a snooze (delay) button on the first temperature-sensitive alert device 202, it can deactivate an alert and extend the alert threshold applied by the second temperature-sensitive alert device 206.

The first temperature-sensitive alert device 202 and the second temperature-sensitive alert device 206 are components which can communicate with each other via a network, such as a Wi-Fi, Ethernet, Bluetooth® or other network. In this manner, the first temperature-sensitive alert device 202 can determine that an alert indicating the cook top 204 has been inadvertently left turned on and the second temperature-sensitive alert device 206 can generate the alert or vice-versa.

In other examples, the first temperature-sensitive alert device 202 generates an alert if the cook top 204 is left on and the second temperature-sensitive alert device 206 generates a different alert if the oven 208 is left on. For example, the first temperature-sensitive alert device 202 can generate an audible alert that sounds different than the audible alert generated by the second temperature-sensitive alert device 206 enabling the user to quickly ascertain which heating device was left on based solely on the sound of the audible alert.

In another example, the first temperature-sensitive alert device 202 can generate a visual alert, such as a flashing light on a first LED display of the temperature-sensitive alert device 202 while the second temperature-sensitive alert device 206 flashes a different light on a second LED display on the second temperature-sensitive alert device 206. In this manner, the user can immediately determine which heating device was left turned on based on the location/placement, color, light brightness, and/or flash pattern of the audible alert light.

In some examples, the first temperature-sensitive alert device synchronizes with the second temperature-sensitive alert device at regularly scheduled time intervals. A regularly scheduled time interval is any pre-determined synchronization date, time and/or time interval. For example, the regularly scheduled time interval can cause the devices to synchronize every twenty-four hours. In other examples, the synchronization occurs every five seconds.

The synchronization time interval can vary depending on whether the heating device is currently in operation. For example, if the heating device is de-activated, synchronization occurs every twelve hours. In other examples, synchronization does not occur at all if the heating device(s) are turned off. In another example, if at least one heating device monitored by at least one temperature-sensitive alert device is activated, the device(s) synchronize every second, every half second, every three seconds or any other pre-determined time interval. During synchronization, the first temperature-sensitive alert device component transmits data to the second component using a first communications device.

In this example, two alert devices synchronize at regular intervals. However, in other examples, three or more temperature-sensitive alert devices monitoring one or more heating devices synchronize at a scheduled time or time-interval. In these examples, one or more alert device transmits data to one or more other alert device, the data including alert activation data, snooze button activation data, duration of heating device usage data, temperature increase associated with heating device usage, temperature data, or other data generated by one or more alert devices.

The synchronization, in some examples, occurs in real-time as the update data is being generated. For example, when the user activates a snooze button, the snooze button activation input data is transmitted to one or more other alert devices in real-time. In other examples, the synchronization occurs as a batch process in which all update data accumulated since the previous synchronization is transmitted at one specific time. In these examples, the batch update data is used to update thresholds, update historical usage data for the heating device(s), etc.

Figure 3:
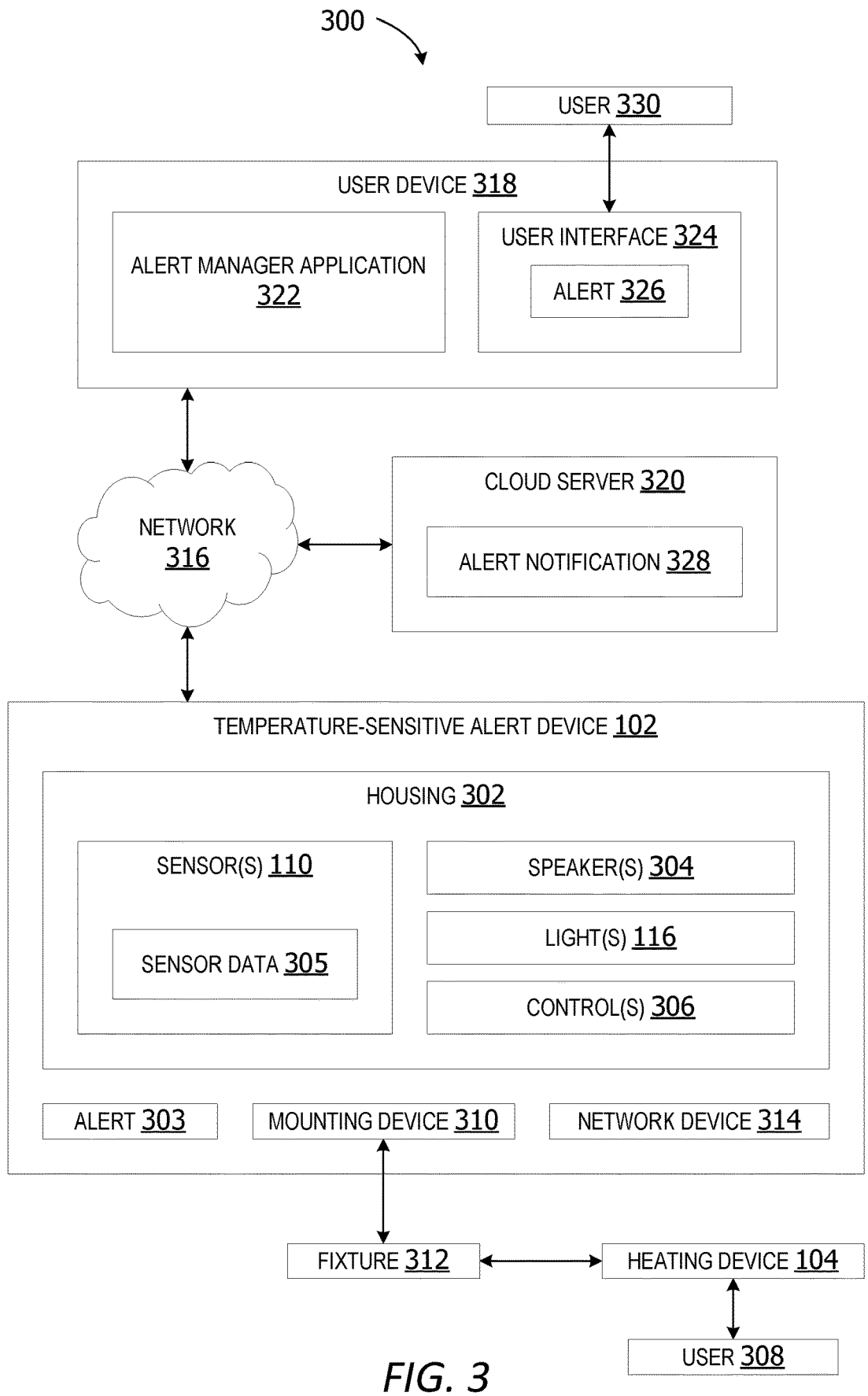
FIG. 3 is an exemplary block diagram illustrating a system enabling temperature-sensitive alerts via a network enabled alert device.

FIG. 3 is an exemplary block diagram illustrating a system 300 enabling temperature-sensitive alerts via a network enabled alert device. The temperature-sensitive alert device 102 includes a housing 302 enclosing or supporting one or more hardware components. The housing 302 can be composed of plastic, metal, a compositive material, or any other suitable material. In some examples, the housing 302 includes one or more sensor(s) 110 and/or one or more light(s) 116 mounted on the exterior surface of the housing, partially embedded within the exterior surface of the housing and/or at least partially enclosed within the housing 302.

One or more speaker(s) 304 are optionally included to generate the audible alert sounds, such as, but not limited to, the audible sound 118 in FIG. 1. The speaker(s) 304 generate a continuous sound or an intermittent sound to alert the user that the heating device is still turned on after a threshold maximum device-on time has expired. The speaker 304 can generate a verbal or non-verbal audible alert sound. The verbal alert can include a plain language recorded or synthesized voice indicating the heating device 104 is turned on by saying "turn oven off", "the burner is still on", "stove on warning" or any other configurable audible warning. In other examples, the speaker generates a non-verbal sound such as a buzzer, siren, air horn, musical tone, beeping or other non-verbal sound.

The temperature-sensitive alert device 102 includes one or more control(s) 306. In this example, the control(s) 306 are physical buttons, switches, knobs, or levers which are used to turn-on or activate the temperature-sensitive alert device 102. The control(s) 306 can also include an alert delay button which is pushed or otherwise activated by a user 308 to activate a snooze function. The snooze function is an alert delay function that temporarily de-activates the alert until an extended time-on maximum duration threshold time has expired.

The temperature-sensitive alert device 102 can optionally include a mounting device 310 used to mount the temperature-sensitive alert device 102 to a fixture 312 or mount the temperature-sensitive alert device 102 to a portion of the heating device 104. The fixture 312 is any type of fixture within proximity to the heating device 104, such as, but not limited to, a wall, ceiling, ventilation, oven hood, cabinet, or any other fixture.

In some examples, the alert device is permanently mounted to the fixture. In other examples, the alert device is moveably or removably mounted such that the alert device may be moved or relocated to a non-permanent position.

The temperature-sensitive alert device 102, in some examples, is an Internet of Things (IoT) enabled device. In these examples, the temperature-sensitive alert device 102 includes a network device 314. The network device 314 enables the temperature-sensitive alert device 102 to connect to a network 316. The network 316 is implemented by one or more physical network components, such as, but without limitation, routers, switches, network interface cards (NICs), and other network devices. The network 316 is any type of network for enabling communications with remote computing devices, such as, but not limited to, a local area network (LAN), a subnet, a wide area network (WAN), a wireless (Wi-Fi) network, or any other type of network. In this example, the network 316 is a WAN, such as the Internet. However, in other examples, the network 316 is a local or private LAN. In other examples, the network 316 includes near field communications (NFC), Bluetooth®, radio frequency (RF) or other short-distance network communications technologies.

The network device 314 includes a network interface card and/or computer-executable instructions (e.g., a driver) for operating the network interface card. Communication between the temperature-sensitive alert device 102 and other devices, such as but not limited to a user device 318, a cloud server 320 and/or Internet of Things (IoT) enabled devices, can occur using any protocol or mechanism over any wired or wireless connection. In some examples, the network device 314 is operable with short range communication technologies such as by using NFC tags.

The user device 318 represents any device executing computer-executable instructions. The user device 318 can be implemented as a mobile computing device, such as, but not limited to, a wearable computing device, a mobile telephone, laptop, tablet, computing pad, netbook, gaming device, and/or any other portable device. The user device 318 includes at least one processor and a memory storing applications, such as, but not limited to, an alert manager application 322. The alert manager application 322 enables the user 308 to control, update and/or customize functions of the temperature-sensitive alert device 102. For example, the user can utilize the alert manager application 322 to update or modify the time-on maximum duration threshold and/or the alert delay function extended time-on maximum duration threshold. If the delay time is too short, the user can increase the alert delay time for longer cooking times. If the threshold is too long, the user can decrease the threshold time before the alert is generated.

The user device 318, in some examples, includes a user interface (UI) 324 device. The UI 324 device displays user-configurable options for user adjustment or customization. The UI 324 can also be used to display an audible or visual alert to the user 308. In other words, rather than the temperature-sensitive alert device 102 generating the alert 326 via a speaker or audible alert generator device, the alert is generated via the UI 324 device. The alert 326 can include an audible sound, a flashing light and/or a graphical display indicating the heating device has not been turned off. The alert 326 generated by the UI device can be generated in addition to an alert 303 or instead of the alert 303. In this manner, the alert 326 can be output to the user utilizing the heating device 104 or output to another user that may be located remotely from the temperature-sensitive alert device 102. For example, if a first user 308 is operating the heating device, a second user 330 can receive another alert 326 notifying the second user that the heating device may have been left on after cooking activities were completed by the first user. Thus, a notification can be sent to the first user or a second user located in the same building or structure as the heating device as well as sending notification(s) to the second user or any other authorized user in a different location than the heating device.

In other examples, the user can utilize the UI 324 device to turn the alert device off or otherwise de-activate the alert device. In other examples, the temperature-sensitive alert device 102 can output notifications to the user, such as a low-battery notification reminding the user to change the batteries in the device. In other examples, the UI can present historical data and trends data to the user via the UI device. The user can utilize the historical data and/or trends to determine whether to update the threshold time-on duration and/or the snooze alert delay time.

The system 300 optionally includes the cloud server 320. The cloud server 320 is a logical server providing services to the user device 318 and/or the temperature-sensitive alert device 102. The cloud server 320 is hosted and/or delivered via the network 316.

In some non-limiting examples, the cloud server 320 is associated with one or more physical servers in one or more data centers. In other examples, the cloud server 320 is associated with a distributed network of servers. The cloud server 320 can receive sensor data 305 from the temperature-sensitive alert device 102. The sensor data 305 is analyzed by the cloud server 320 to determine whether the heating device is turned on and determine whether to activate the alert 303. The cloud server 320 transmits an instruction to initiate an alert to the temperature-sensitive alert device 102 if the time-on maximum duration threshold is exceeded.

In other examples, the cloud server 320 transmits an alert notification 328 to a user device, such as, but not limited to, the user device 318. The alert notification notifies a user that the heating device has been left on for longer than expected and may have unintentionally been left turned on. The alert notification can be provided to the user 308 operating the heating device and/or another user 330 that may be authorized to receive the notifications, such as a homeowner, parent, guardian, family member or other user.

Figure 4:
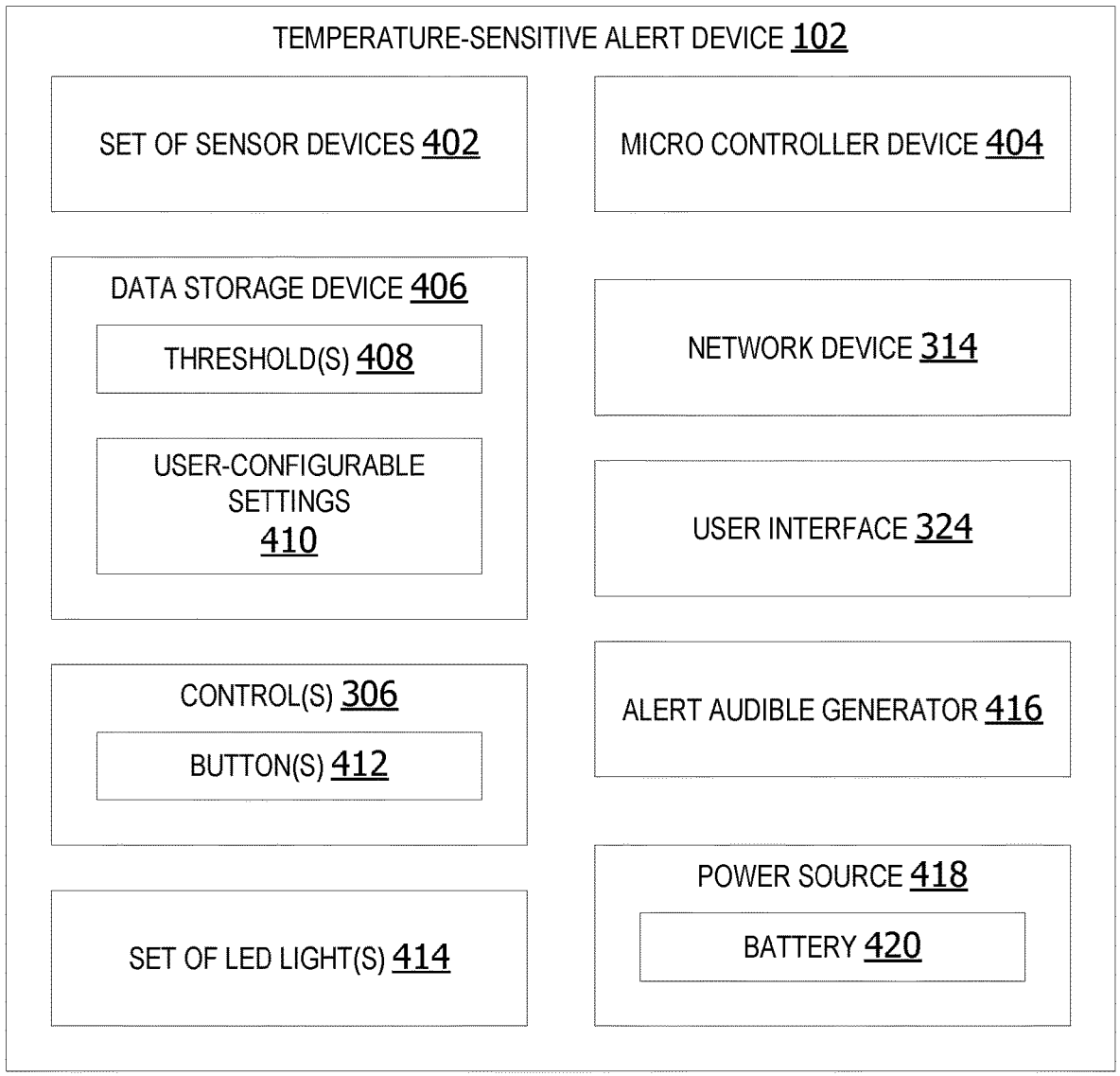
FIG. 4 is an exemplary block diagram illustrating a temperature-sensitive alert device.

FIG. 4 is an exemplary block diagram illustrating a temperature-sensitive alert device 102. In some examples, the temperature-sensitive alert device 102 includes a set of sensor devices 402. The set of sensors includes one or more sensor devices, such as, but not limited to, the sensor(s) 110 in FIG. 1. The set of sensor devices 402 generates sensor data associated with the heating device. The sensor data is analyzed by a microcontroller device 404.

The microcontroller device 404 includes one or more processors for executing computer-executable instructions. The microcontroller device applies one or more thresholds to the time and temperature data to determine when to generate an alarm and/or how long to initiate the alarm.

The temperature-sensitive alert device 102 optionally includes a data storage device 406. The data storage device 406 can include one or more different types of data storage devices, such as, for example, one or more rotating disks drives, one or more solid state drives (SSDs), and/or any other type of data storage device. The data storage device 406, in some non-limiting examples, includes a redundant array of independent disks (RAID) array. In other examples, the data storage device 406 includes a database. The data storage device 406, in this example, is included within the temperature-sensitive alert device 102. In other examples, the data storage device 406 includes a remote data storage accessed by the computing device via the network, such as a remote data storage device, a data storage in a remote data center, or a cloud storage.

The data storage device 406 stores data associated with generating temperature-sensitive alerts, such as, but not limited to, one or more threshold(s) 408 and/or user configurable settings 410. The threshold(s) 408 include threshold temperatures for determining when a heating device is turned on and/or maximum time-on duration threshold prior to generating the alert.

User-configurable settings 410 are settings adjusted or updated by a user. For example, a user-configurable setting can include a user-selected delay (snooze) time for delaying the alert. In other examples, the user-configurable settings can include a user selecting an audible alert type, alert volume or other alert-related settings which are adjustable by the user.

For example, the user can configure the alert volume to increase the alert volume for a user that is hard of hearing or decrease the alert volume for a user with sensory processing disorder that may be more sensitive to loud noises. In another example, the alert sounds can have a graduated volume in which the initial alert sounds are generated at a lower first volume. If the heating device remains on for a threshold time, the volume of the alert is increased to a second volume. If the heating device remains on after the threshold time, the volume is increased from the second volume to a louder third volume, etc. In this manner, an alert is initially a softer or quieter alert which becomes increasingly louder if the user fails to either turn off the heating device or push the snooze button to extend the threshold time-on duration.

In other examples, the user can adjust or select the type of sound generated during an alert. The alert sound can include a buzzer, siren, beep, musical tone, bells, chimes, or any other type of sound.

The user interface 324 device includes a graphics card for displaying data to the user and receiving data from the user. The user interface 324 device can also include computer-executable instructions (e.g., a driver) for operating the graphics card. Further, the user interface 324 device can include a display (e.g., a touch screen display or natural user interface) and/or computer-executable instructions (e.g., a driver) for operating the display. The user interface 324 device can also include one or more of the following to provide data to the user or receive data from the user: speakers, a sound card, a camera, a microphone, a vibration motor, one or more accelerometers, a Bluetooth® brand communication module, global positioning system (GPS) hardware, and a photoreceptive light sensor.

The control(s) 306 in some examples include one or more button(s) 412. The button(s) 412 can include an on/off (power) button to turn the temperature-sensitive alert device 102 on or off. The button(s) 412 can also include an alert delay snooze button to temporarily stop or delay an alert to permit longer than usual cooking times.

The temperature-sensitive alert device 102 includes a set of one or more light emitting diode (LED) light(s) 414. The LED light(s) are capable of lighting up in one or more colors. The LED light(s) can flash in a single flash pattern or multiple different flash patterns depending on the type of alert. For example, if the alert is a first alert, a first flash pattern is displayed. If the heating device remains on for a threshold period of time after the first alert, a second flash pattern is displayed. If the heating device remains on a threshold period of time after the second alert, a third flash pattern is displayed, and so forth.

In other examples, the LED light(s) 414 displays a first colored light to indicate a standby mode prior to meeting the threshold time-on maximum duration threshold and a second different colored light to indicate an alert mode after the threshold time-on maximum duration is exceeded. For example, a green light can be displayed to indicate the heating device is on but the threshold time has not been reached. A red light can be displayed or flashed when the threshold time-on maximum duration threshold is reached or exceeded.

An audible alert generator 416 is a device for generating an audible sound alert, such as, but not limited to, a buzzer, horn, bell, whistle, or other alert sound. The audible alert generator 416 can include a speaker for generating the audible alert sound.

The temperature-sensitive alert device 102 is powered by a power source 418. The power source 418 in this example includes one or more batteries, such as but not limited to, a battery 420. In other examples, the temperature-sensitive alert device 102 is powered by an electrical power source providing alternating current (AC) electrical power to the temperature-sensitive alert device 102.

Figure 5:
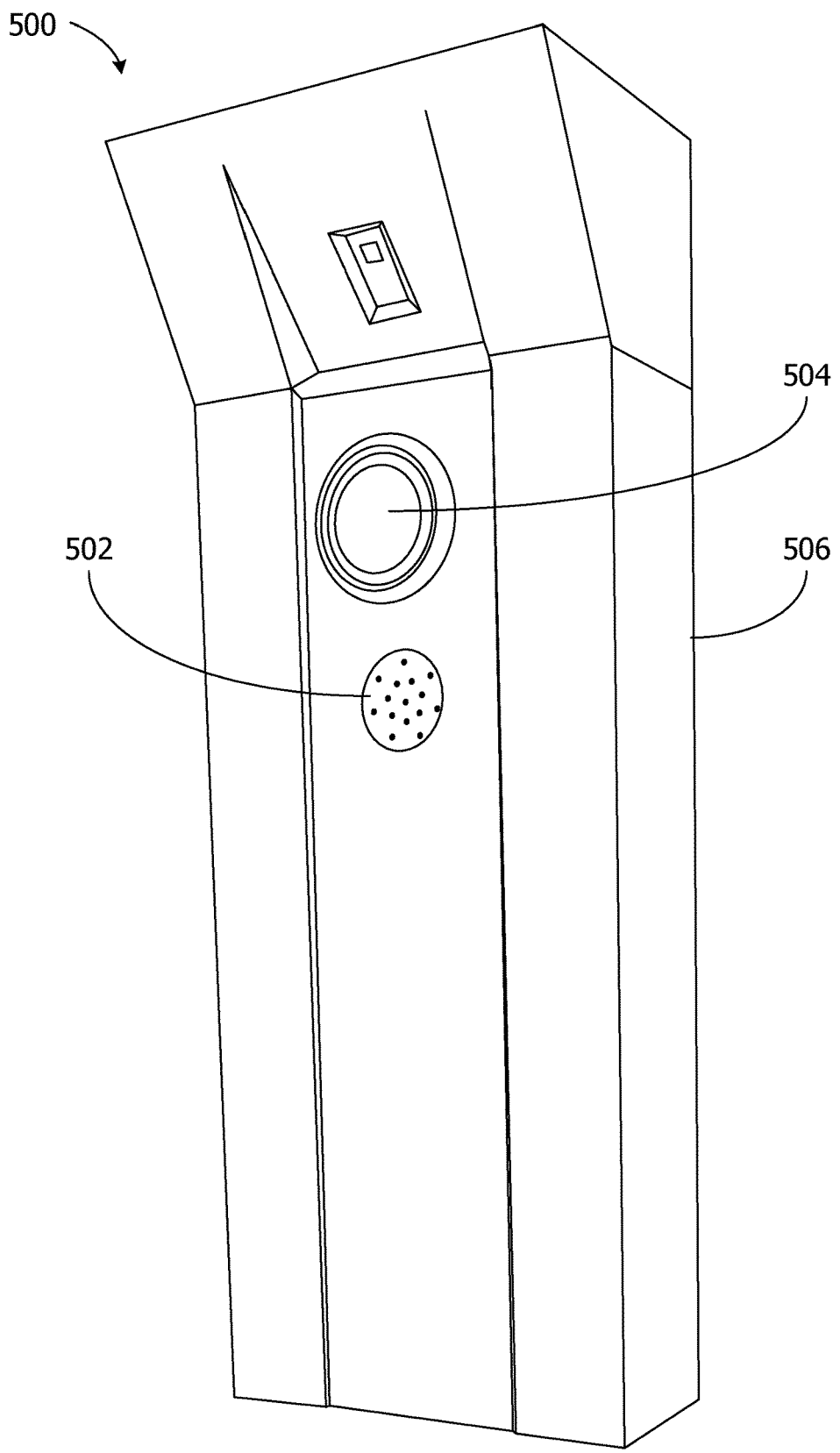
FIG. 5 is an exemplary block diagram illustrating a temperature-sensitive alert device having a speaker and snooze button.

FIG. 5 is an exemplary block diagram illustrating a temperature-sensitive alert device 500 having a speaker 502 and snooze button 504. The speaker 502 is associated with a housing 506. In this example, the speaker 502 is at least partially embedded within the housing.

The snooze button 504 is a physical button, such as, but not limited to, the button(s) 412 in FIG. 4. The snooze button 504 can also be referred to as an alert delay function button. The snooze button 504 is a time-delay switch used to initiate a delay of the alert for an extended time-on maximum duration threshold. In this example, the delay button 504 is a physical button. In other examples, the snooze button is a graphical icon displayed on a graphical UI which is activated via a touchscreen.

Figure 6:
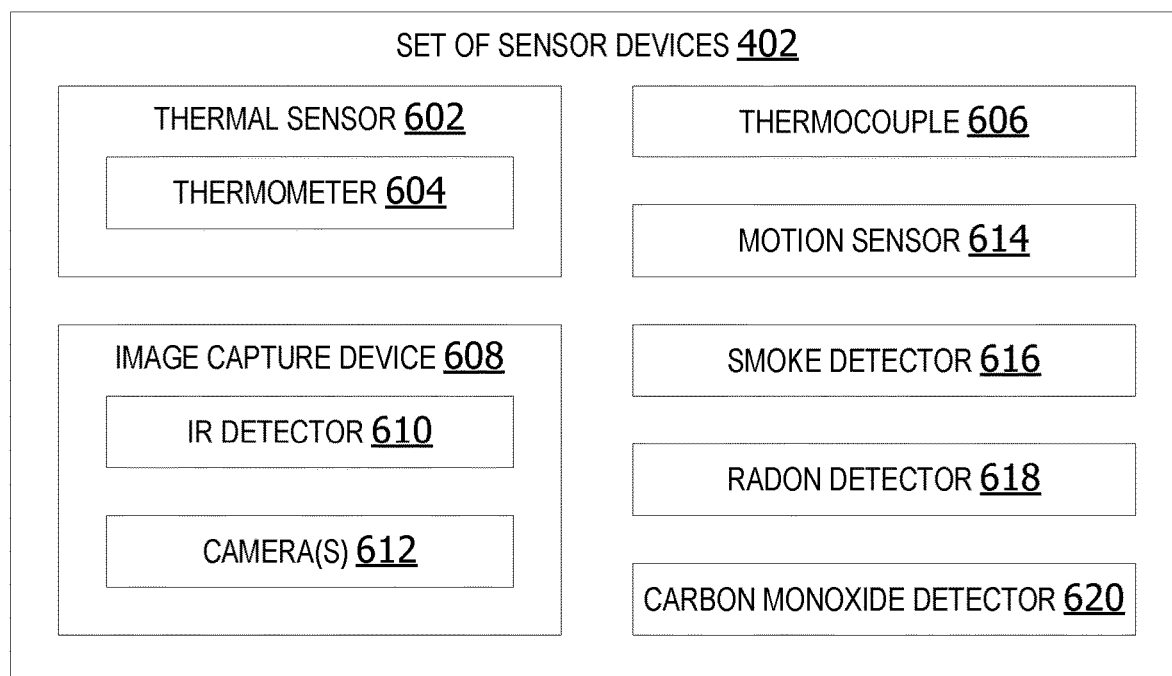
FIG. 6 is an exemplary block diagram illustrating a set of sensor devices associated with a temperature-sensitive alert device.

FIG. 6 is an exemplary block diagram illustrating a set of sensor devices 402 associated with a temperature-sensitive alert device. In some examples, the set of sensor devices 402 includes a thermal sensor 602. The thermal sensor 602 is a sensor that detects and measures heat, such as, but not limited to, a thermometer 604. The thermometer can be an analog or digital thermometer.

The set of sensor devices 402 optionally includes a thermocouple 606. The thermocouple 606 is a device for measuring temperature changes.

The set of sensor devices 402 can include one or more image capture devices such as, but not limited to, the image capture device 608. The image capture device may be implemented as any type of device for capturing images. The image capture device may generate still images or a series of images in a video. The image capture device in this example may be implemented as an infrared (IR) camera using thermographic sensors to generate images and/or a non-IR camera using light sensors to generate images.

The image capture device 608 can include one or more IR detector(s) 610, one or more camera(s) 612, as well as any other type of image capture device. The image capture device 608 captures images of the heating device and utilizes the images to determine if the heating device is turned on. For example, an IR detector 610 can be used to detect heat generated by the heating device. In another example, an image generated by a camera 612 can be used to determine if a gas burner flame is lit or if a knob on an oven or stove is turned to the on position.

The set of sensor devices 402 can also optionally include a motion sensor 614 for detecting motion of a user cooking or otherwise utilizing the heating device. If a user is detected operating the heating device, the system can determine that the heating device has not been left turned on unintentionally. In other words, if a user is moving near the stove or oven, the alert device can predict that the oven or stove is currently attended.

In still other examples, the set of sensor devices 402 optionally includes a smoke detector 616, a radon detector 618 and/or a carbon monoxide detector 620. In these examples, the temperature-sensitive alert device generates an alert if smoke, radon and/or carbon monoxide is detected. Thus, the alert device can generate alerts for other potentially hazardous situations and environmental conditions in addition to heating devices left turned on for extended periods of time.

Figure 7:
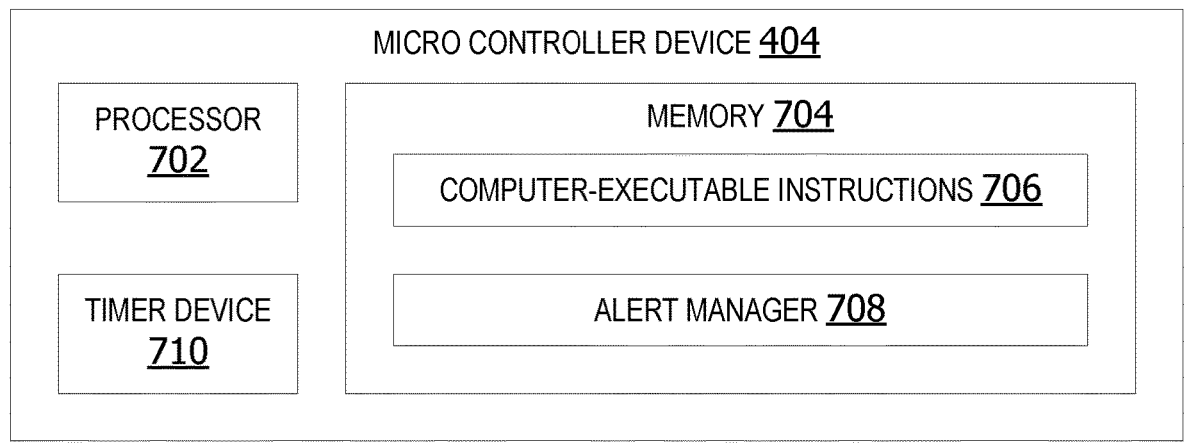
FIG. 7 is an exemplary block diagram illustrating a microcontroller device associated with a temperature-sensitive alert device.

FIG. 7 is an exemplary block diagram illustrating a microcontroller device 404 associated with a temperature-sensitive alert device 102. In some examples, the microcontroller device 404 has at least one processor 702 and a memory 704.

The processor 702 includes any quantity of processing units and is programmed to execute the computer-executable instructions 706. The computer-executable instructions 706, in some example, is performed by the processor 702, performed by multiple processors within the microcontroller device 404 or performed by a processor external to the microcontroller device 404. In some examples, the processor 702 is programmed to execute instructions such as those illustrated in the figures (e.g., FIG. 9, FIG. 10, FIG. 11, FIG. 12, and FIG. 13).

The memory 704 includes any quantity of media associated with or accessible by the processor 702. The memory 704 stores data, such as one or more applications. The applications can communicate with counterpart applications or services such as web services accessible via a network. In an example, the applications represent downloaded client-side applications that correspond to server-side services executing in a cloud.

In other examples, the memory 704 also includes an alert manager 708 which is executed to perform functions associated with generating alerts. The alert manager 708 analyzes the sensor data generated by sensors to determine when the heating device is turned on and/or turned off. In other examples, the alert manager 708 compares a duration of time during which the heating device is turned on with a threshold to determine when to output an alert.

The microcontroller device 404 includes an optional timer device 710 for monitoring a length of time that the heating device is turned on and/or generating heat. The timer device 710 increments a counter to measure time-on duration. In other examples, the timer device 710 generates a timestamp when a device is on. The alert manager 708 compares the timestamp with a current time to calculate the time-on duration. The time-on duration is compared with the threshold time. If the time-on duration exceeds the threshold time, the alert is activated (turned on).

Figure 8:
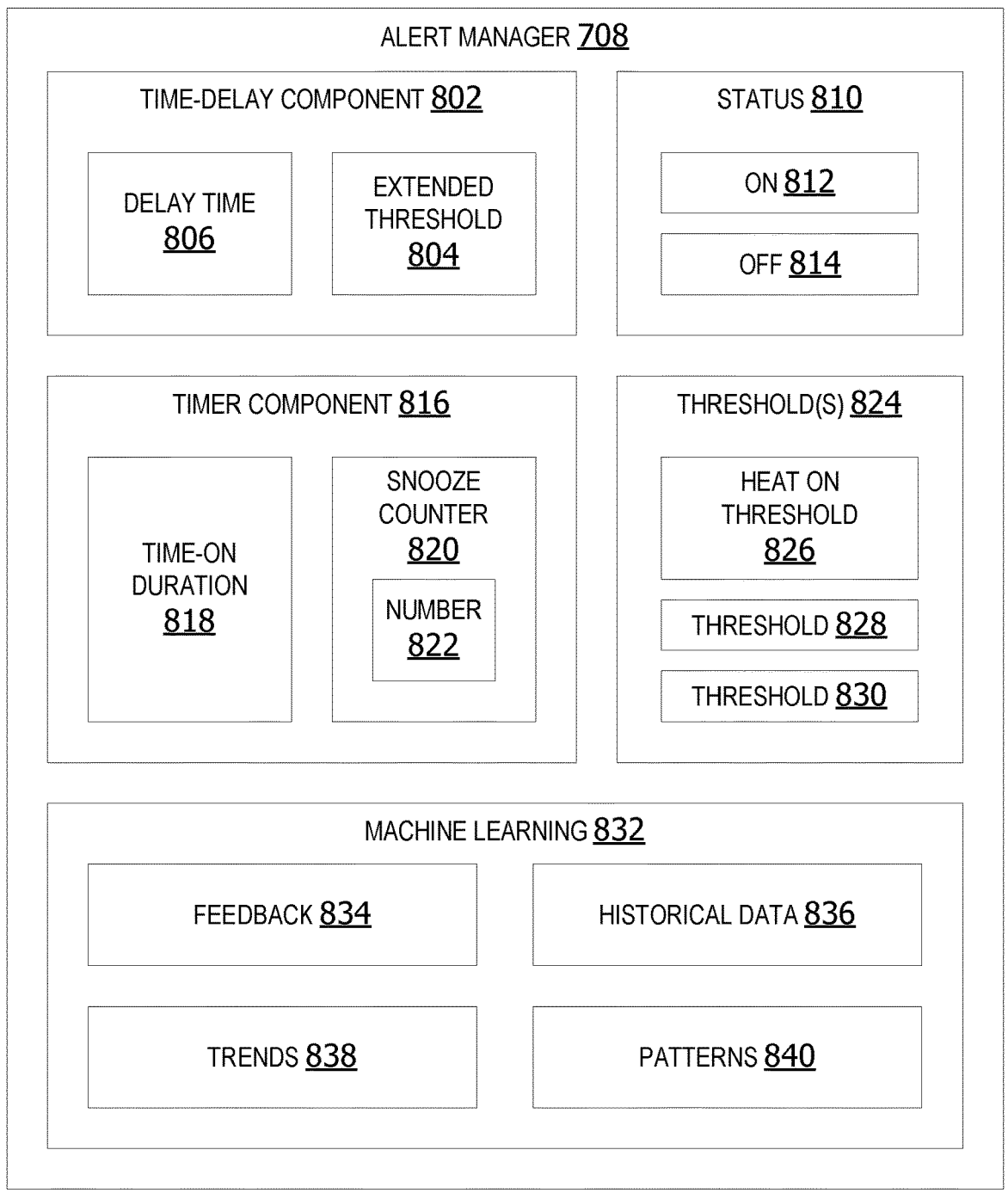
FIG. 8 is an exemplary block diagram illustrating an alert manager associated with a temperature-sensitive alert device.

FIG. 8 is an exemplary block diagram illustrating an alert manager 708 associated with a temperature-sensitive alert device. In some examples, the alert manager 708 includes a time-delay component 802. The time-delay component 802 is a software component that extends the threshold time-on maximum duration threshold by an extended length of time. The length of the time extension is determined based on a user-configurable extended threshold 804. When applied, the extended threshold extends the wait/stand-by time by a user-configurable delay time period.

In some examples, if the delay time 806 is one hour and the usual threshold time is three hours, the alert manager 708 delays initiating the alert until the heating device has been on for four hours instead of only three hours when the time-delay has been initiated. In another example, if the delay time is thirty minutes and the threshold time is one hour, the alert manager delays initiating the alert until the heating device has been on for one and a half hours instead of only one hour.

In other examples, the time-delay is initiated after an alert has gone off. The user can activate a snooze button to temporarily stop the alert. The alert is not re-initiated by the alert manager 708 until the extended threshold 804 time has passed after the snooze button is pushed. Thus, if the extended threshold 804 is two hours and the user pushes the snooze button after the alert has gone off, the alert manager 708 turns of the alert and waits two hours before re-initiating the alert. If the heating device is already turned off when the extended threshold time is reached, the alert manager does not re-initiate the alert.

In other examples, the alert manager 708 maintains a status 810 of the heating device associated with the alert manager 708. The status 810 is an "on" status 812 or an "off" status 814.

A timer component 816 is a software component for calculating a time-on duration 818 of a heating device. The time-on duration 818 is the length of time that the heating device is turned on and generating heat detectable by the temperature-sensitive alert device.

The snooze counter 820 monitors a number of times a user hits the snooze button to extend the threshold time-on duration before the alert is generated. If the number of extensions 822 increases beyond a threshold number, the normal time-on maximum duration threshold is extended/updated to lengthen the time before the alert is activated. In this manner, the system adjusts the thresholds in response to frequent use of the snooze function.

The alert manager 708 utilizes one or more threshold(s) 824. The thresholds include a heat on threshold 826. The heat on threshold 826 is a minimum temperature or amount of heat to be detected prior to changing the status of the heating device from the off status to the on status. When the temperature detected reaches the minimum heat on threshold

826, the alert manager 708 changes the status of the heating device from the off status 814 to the on status 812.

The threshold 828 is the time-on maximum duration threshold indicating the maximum amount of time that the heating device is expected to be turned on. When the time-on duration 818 reaches the threshold 828, the alert manager 708 initiates the alert.

In other examples, the one or more thresholds 824 include a graduated series of thresholds used to initiate a series of gradually more intense alerts. For example, if a first threshold 828 is reached, a first alert is initiated. The first alert may have a softer or quieter alert sound and or slower flashing. If the heating device remains on after the first alert, the alert manager 708 initiates a second alert when a second threshold 830 is reached. The second alert is more noticeable than the first alert. For example, the second alert can be louder than the first alert and/or the light(s) may flash faster than the first alert. In this manner, a series of gradually louder and more urgent alerts are output as the time-on duration grows longer past the initial first alert.

In this example, there are two graduated thresholds used to increase intensity of alerts over time if the user fails to turn the heating device off. In other examples, three or more graduated thresholds may be applied to gradually increase intensity of alerts until the heating device is turned off.

In still other examples, the thresholds 824 can include a maximum temperature threshold which is used to initiate an alert even if the maximum time-on threshold has not yet been reached. In this example, if the alert device detects a temperature that is equal to or greater than a maximum threshold, the alert is initiated even if the heating device is turned off or the heating device has not been turned on for the normal time-on maximum duration threshold. This might occur, for example, if a heating device is turned up too high or if a fire has broken out which could result in higher temperature than would be expected from an oven or burner.

In some examples, the expected temperature is the average temperature. In other examples, the expected temperature is a user-defined value. In still other examples, the expected temperature is a range of temperatures frequently employed by a specific user or by an average person. The expected temperature is a dynamic value which can be changed or updated by the user or by the system based on user feedback, usage of the snooze button, etc.

The one or more threshold(s) 824 in this example are stored within the memory. In other examples, the threshold(s) 824 may be stored within one or more database(s) within one or more data storage devices(s).

In other examples, the alert manager 708 includes machine learning 832. The machine learning 832 includes pattern recognition, modeling, or other machine learning algorithms to analyze sensor data, user feedback 834, historical data 836, trends 838, patterns 840 and/or database information to generate alerts, including notifications. The user feedback 834 can include the number of times a user hits the snooze button to delay or temporarily stop the alert. The historical data 836 includes historical number of alerts, number of times the snooze button is used, the number of user changes/updates to the thresholds, etc. The trends indicate whether updates to the thresholds are trending towards increasing the time-on duration before an alert or decreasing the time-on duration before the alert is output.

In some examples, the analysis engine and/or machine learning component compares one or more IR images in the sensor data and/or one or more temperatures to a patterns stored in a database to identify an optimal temperature threshold and/or time threshold for generating the alert. In other examples, the machine learning component uses the data stored in one or more databases with real-time sensor data to learn how to optimize the thresholds and snooze time to reduce false alarms and improve user convenience.

Figure 9:
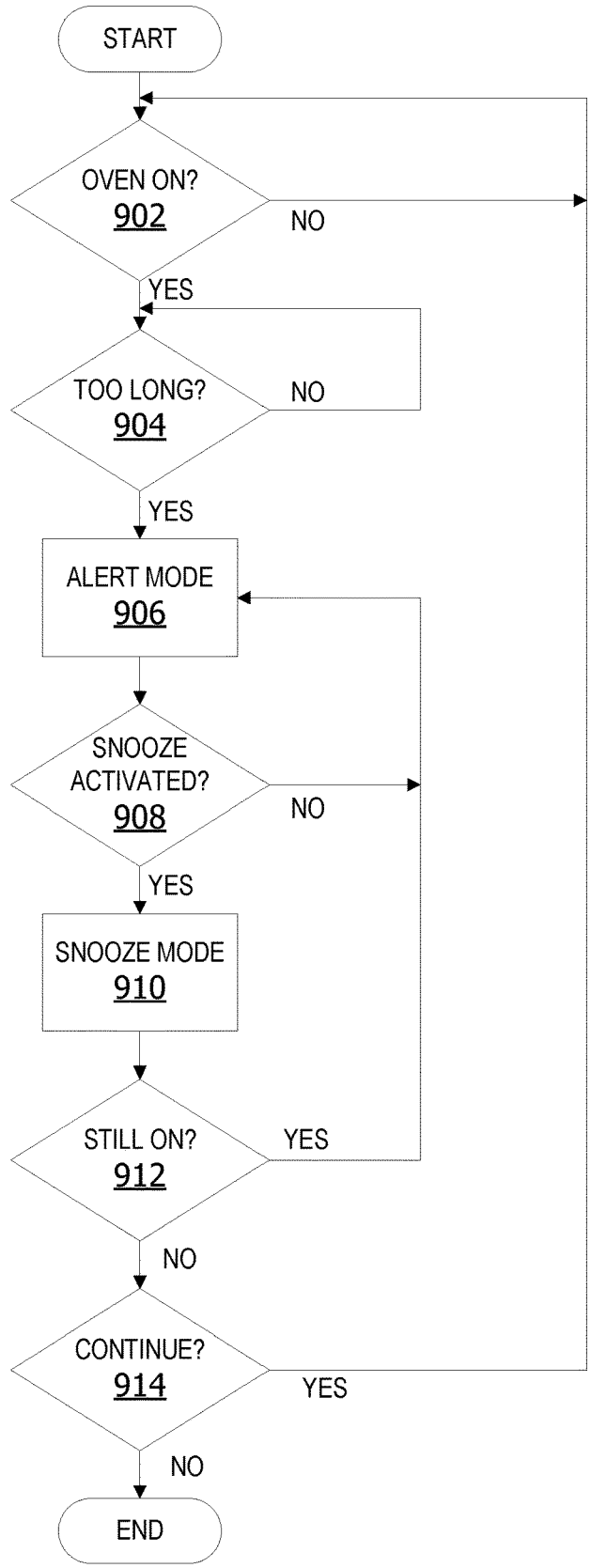
FIG. 9 is an exemplary flow chart illustrating operation of the temperature-sensitive alert device to activate and de-activate an alert.

FIG. 9 is an exemplary flow chart illustrating operation of the temperature-sensitive alert device to activate and de-activate an alert. The process shown in FIG. 9 is implemented by a device that provides an alert if a heating device remains past an expected time, such as the temperature-sensitive alert device 102 in FIG. 1.

The process begins by determining if an oven or other heating device is turned on at 902. This determination is made based on sensor data from a thermal detecting device, such as a thermometer or thermocouple. If the heating device is on, the alert device determines if the heating device has been on for too long at 904. The heating device is on for too long if the device time-on duration exceeds a threshold maximum time. If the heating device (oven) is on for too long, the alert device switches into an alert mode. In the alert mode, the alert device generates an alert, such as, but not limited to, the alert 303 in FIG. 3. The alert can be an audible alert, a visual alert or an alert having both an audible and visual component.

The alert device determines if the snooze function is activated at 908. The snooze mode 910 is activated when a user presses a snooze button or otherwise activates the snooze function using a control. If the snooze is activated, the alert device determines if the heating device is still on at 912. The heating device is still on if the alert device can still detect heat emanating from the heating device which exceeds a threshold level. If the heating device is still on, the alert device remains in alert mode and re-initiates the alert when the snooze time has expired.

If the heating device is turned off, the alert device determines whether to continue at 914. The heating device continues if the alert device is still turned on. The alert device continues monitoring the heating device to determine if the heating device is turned back on at 902. The alert device iteratively executes operations 902 through 914 until the alert device is turned off or the alert device loses power. The process terminates thereafter.

The process shown in FIG. 9 is implemented by an alert device in this example. In other examples, one or more of the operations can be performed by a remote user device or a cloud server.

Figure 10:
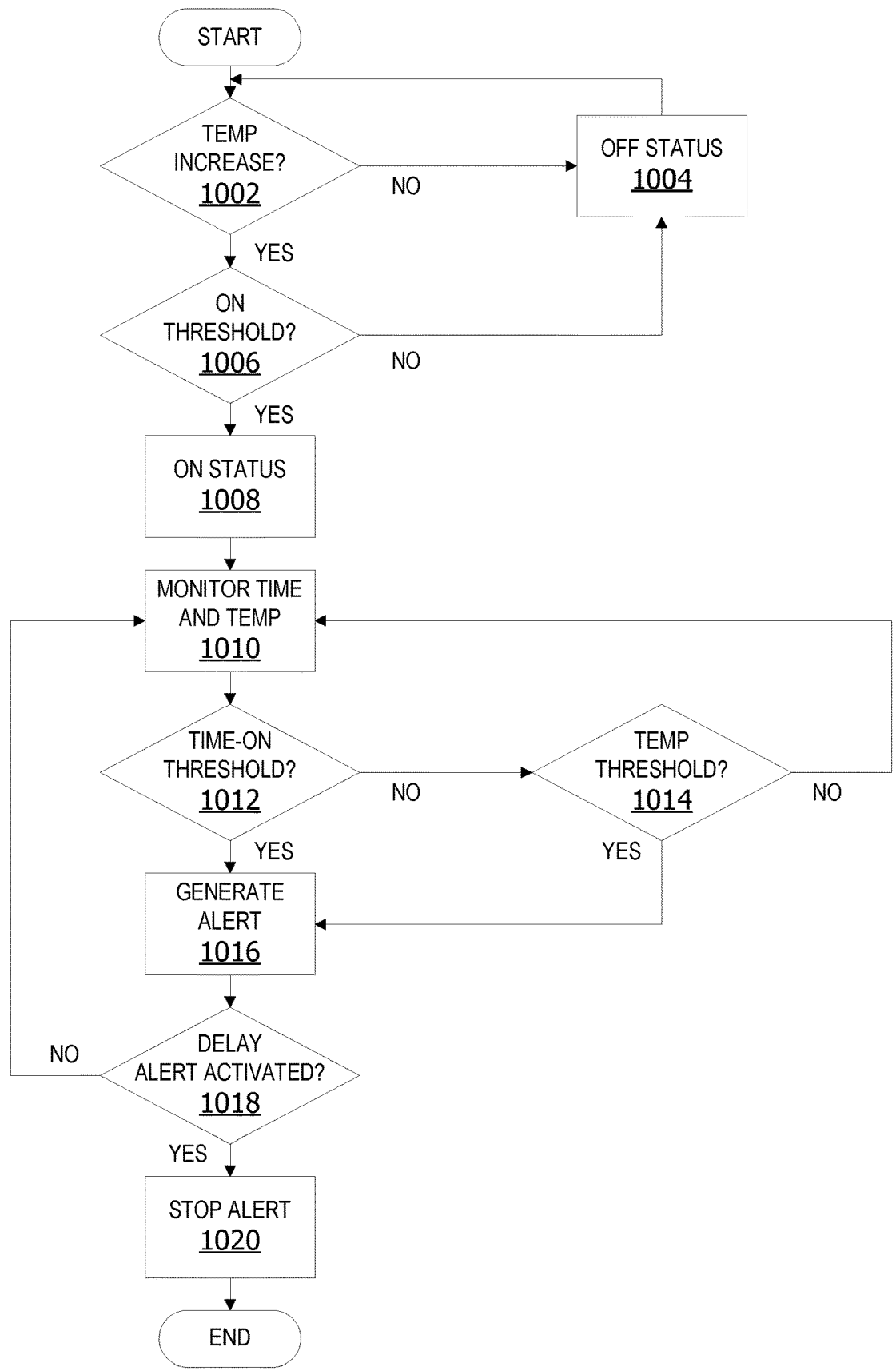
FIG. 10 is an exemplary flow chart illustrating operation of the temperature-sensitive alert device to generate an alert if a time threshold and temperature threshold are exceeded.

FIG. 10 is an exemplary flow chart illustrating operation of the temperature-sensitive alert device to generate an alert if a time threshold and temperature threshold are exceeded. The process shown in FIG. 10 is implemented by a device that provides an alert if a heating device remains on past an expected time, such as the temperature-sensitive alert device 102 in FIG. 1.

The process begins by determining if a temperature increase associated with a heating device is detected at 1002. If not, the off status of the heating device is unchanged at 1004. If yes, the alert device determines if the change in temperature reaches a threshold minimum temperature at 1006. If not, the off status is unchanged at 1004. If yes, the status of the heating device is changed to an on status at 1008. The alert device monitors time and temperature at 1010. The alert device determines if the time-on duration reaches the time-on maximum duration threshold at 1012. If yes, the alert device generates an alert at 1016. If the time-on threshold has not been reached at 1012, the alert device determines if a temperature threshold is met at 1014. If a maximum temperature threshold is not met, time and temperature is monitored at 1010. If a maximum temperature threshold is met or exceeded, the alert device generates an alert at 1016. The alert device determines if an alert delay is activated at 1018. An alert delay is activated if a user selects a snooze function or presses a snooze button. If yes, the alert is stopped at 1020. The process terminates thereafter.

The process shown in FIG. 10 is implemented by an alert device in this example. In other examples, one or more of the operations can be performed by a remote user device or a cloud server.

The expected time during which the heating device remains turned on is the amount of time the system expects the heating device to be used by a user. The expected time in some examples is a user configured amount of time or time range. In other examples, the expected time is an average amount of time the heating device is usually operated. In still other examples, the expected time is a threshold time. The threshold time is a default threshold in some examples. In other examples the threshold time is a user-defined value. In still other examples, the threshold time is a machine learning generated value customized to the heating device usage of a specific user. The threshold value is dynamically adjustable based on changing usage of the heating device by the user over time. In one example, if a user begins cooking for longer or shorter time period or cooking user higher or lower temperatures, the system adjusts the threshold value(s) accordingly to reflect the new "average" cooking time and cooking temperatures being used.

Figure 11:
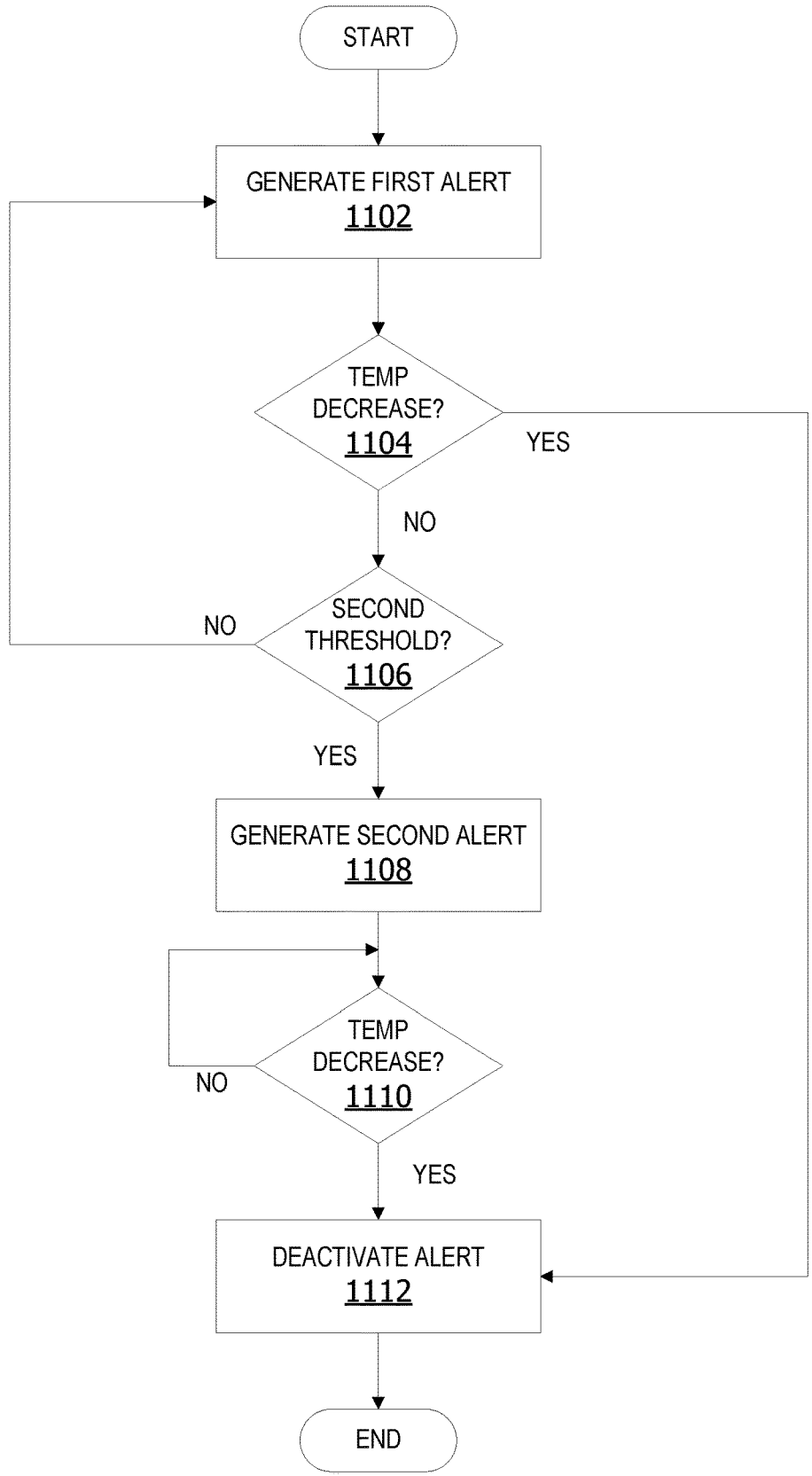
FIG. 11 is an exemplary flow chart illustrating operation of the temperature-sensitive alert device to generate a gradually intensifying alerts based on a series of thresholds.

FIG. 11 is an exemplary flow chart illustrating operation of the temperature-sensitive alert device to generate a gradually intensifying alerts based on a series of thresholds. The process shown in FIG. 11 is implemented by a device that provides an alert if a heating device remains on past an expected time, such as the temperature-sensitive alert device 102 in FIG. 1.

The process begins by generating a first alert at 1102. The alert is generated when a time-on duration of a heating device is greater than or equal to the time-on maximum duration threshold. The alert device determines if a temperature decrease is detected which is equal to or less than a minimum device-on threshold at 1104. If yes, the alert is deactivated at 1112. If the temperature does not decrease, the alert device determines if the time-on duration is greater than or equal to a second time-on maximum duration threshold at 1106. If no (at 1106), the first alert is continued at 1102. If the time-on duration is greater than or equal to the second time-on maximum duration threshold at 1106, a second alert is generated at 1108. The second alert is louder and/or more urgent than the first alert. A determination is made whether the temperature of the heating device is decreasing at 1110. If yes, the second alert is de-activated at 1112. Otherwise, the second alert continues until sensor data indicates the temperature is decreasing, such as when the heating device is turned off. The process terminates thereafter.

The process shown in FIG. 11 is implemented by an alert device in this example. In other examples, one or more of the operations can be performed by a remote user device or a cloud server.

Figure 12:
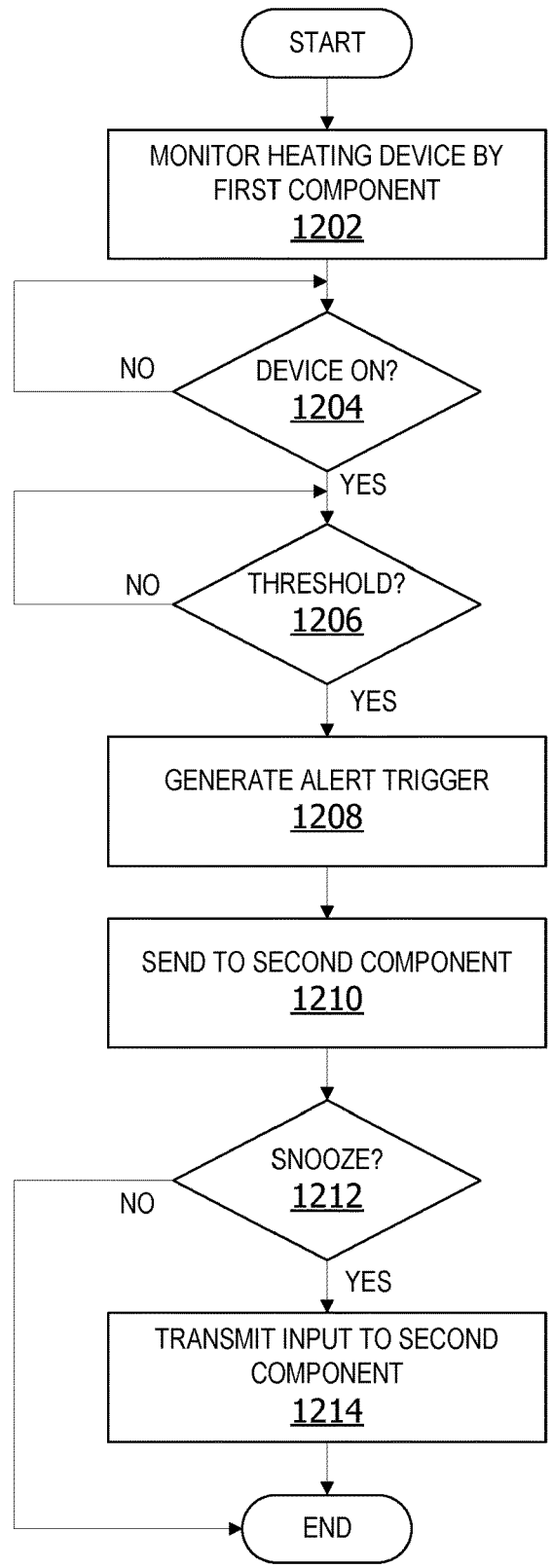
FIG. 12 is an exemplary flow chart illustrating operation of the temperature-sensitive alert device to synchronize dual components.

FIG. 12 is an exemplary flow chart illustrating operation of the temperature-sensitive alert device to synchronize dual components. The process shown in FIG. 12 is implemented by a device that provides an alert if a heating device remains on past an expected time, such as the temperature-sensitive alert device 102 in FIG. 1.

The process begins by monitoring a heating device by a first component of the temperature-sensitive alert device at 1202. A determination is made whether the heating device is on at 1204. In this example, the determination is made based on sensor data generated by one or more sensors, such as a temperature sensor. If yes, a determination is made whether the device is turned on for the maximum threshold time at 1206. If yes, the first component generates an alert trigger at 1208. The alert trigger is a signal or other trigger which triggers a device to generate an alert. The alert can be a visual alert, an audible alert, a haptic alert, etc. The alert trigger is sent to a second component of the temperature-sensitive alert device at 1210. The second component generates the alert. A determination is made at the first component to determine whether a snooze button is activated at 1212. If not, the process terminates thereafter.

If the snooze button is activated at 1212, input is transmitted to the second component indicating the snooze button activation at 1214. The input triggers the second component to de-activate the alert for the delay time. The process terminates thereafter.

Figure 13:
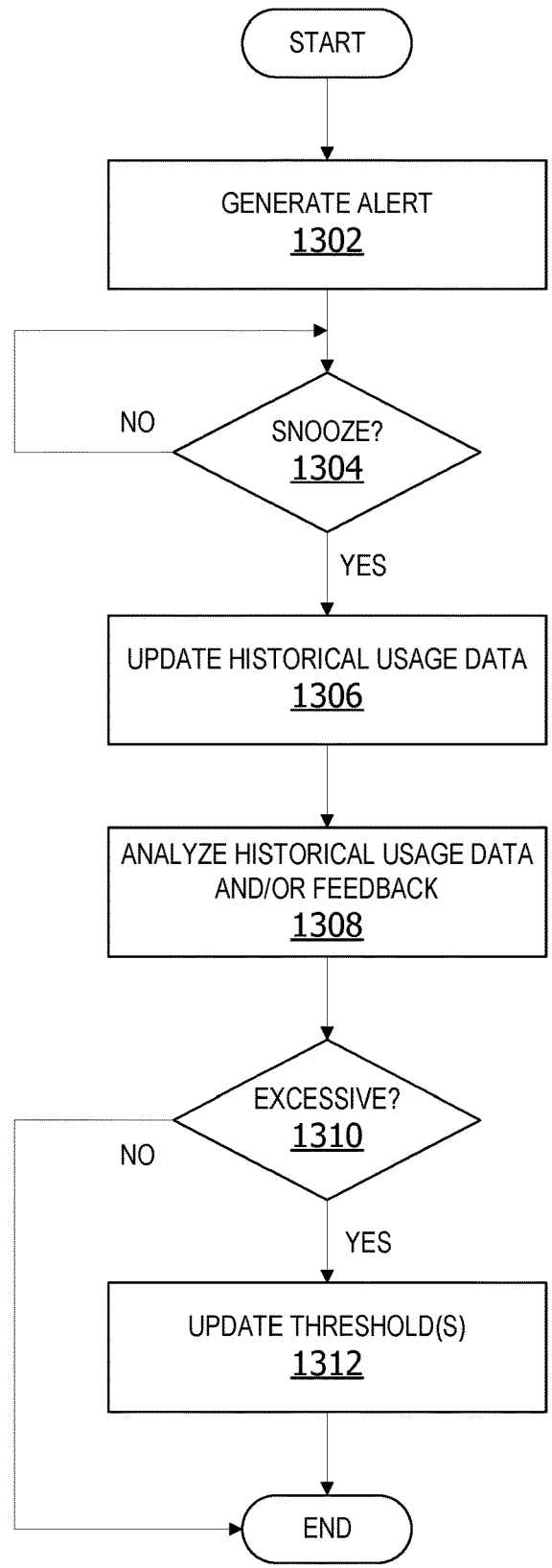
FIG. 13 is an exemplary flow chart illustrating operation of the temperature-sensitive alert device to update a threshold based on historical data.

FIG. 13 is an exemplary flow chart illustrating operation of the temperature-sensitive alert device to update a threshold based on historical data. The process shown in FIG. 13 is implemented by a device that provides an alert if a heating device remains on past an expected time, such as the temperature-sensitive alert device 102 in FIG. 1.

The process begins by generating an alert at 1302. A determination is made whether a snooze button is activated to temporarily de-activate the alert at 1304. If yes, historical usage data is updated. A machine learning model analyzes the historical usage data and/or user feedback at 1308. The machine learning model includes any type of machine learning model trained using a set of training data, such as annotated example data, user feedback, etc. The machine learning model includes an algorithm to perform complex tasks and learn over time. The machine learning model is trained to recognize patterns and make predictions.

A determination is made whether snooze button activation is excessive at 1310. Snooze button usage is excessive, in some examples, if the number of snooze button activations within a given time-period exceeds an expected number of activations or threshold number of activations. If snooze button usage is not excessive, the process terminates. If the snooze button usage is excessive (exceeds a threshold) at 1310, the system updates the threshold(s) to extend the time duration prior to alert generation to reduce the number of future snooze button activations. The process terminates thereafter.

FIG. 14 is an exemplary table 1400 of operation modes for a temperature-sensitive alert device. In some examples, the alert device has a waiting mode in which the LED lights are off, and the audible alert (buzzer) is off. When the heating device (oven) is turned on, the LED light is turned on indicating a standby or monitoring mode, but the audible alert remains off. If the oven is on for a long time (beyond threshold time), the LED light(s) begin flashing an alert and the audible alert turns on. If the user pushes the snooze button to initiate an alert delay, the LED light remains on in standby/monitoring mode, but the audible alert turns off until the delay time ends. The LED light includes a light on a single temperature-sensitive alert device and/or an LED light on a component of the temperature-sensitive alert device.

Figure 15:
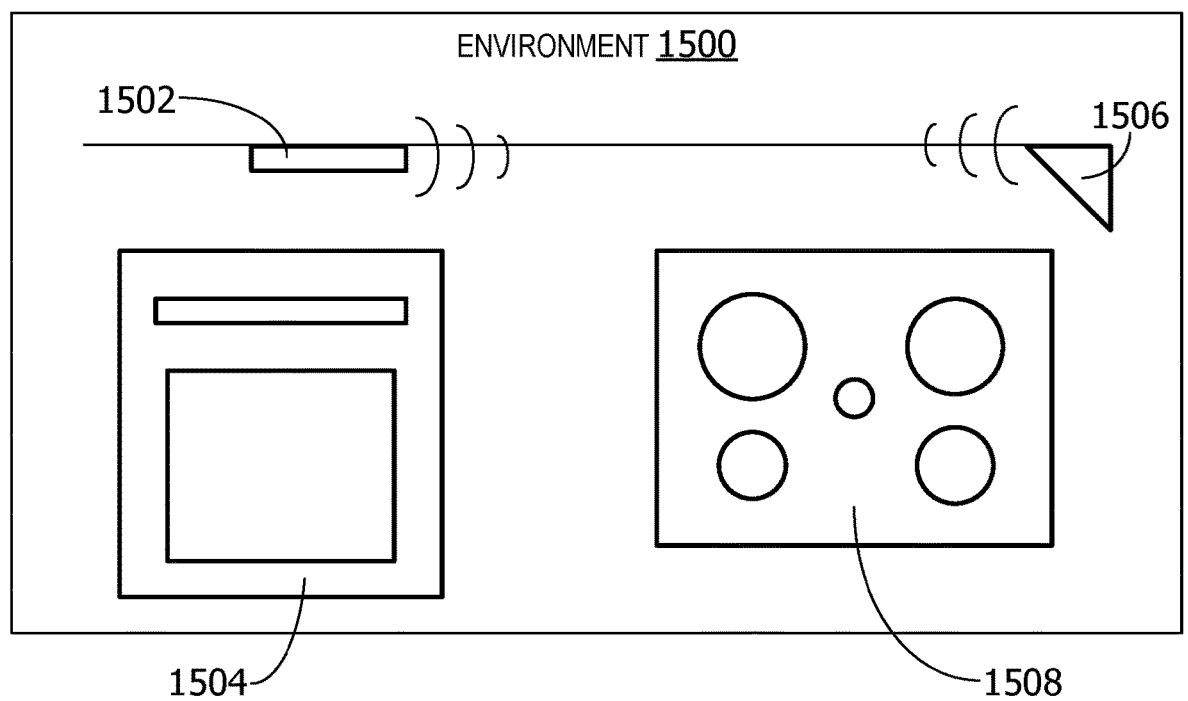
FIG. 15 is an exemplary operating environment for the temperature-sensitive alert device.

FIG. 15 is an exemplary operating environment 1500 for the temperature-sensitive alert device. In this example, the temperature-sensitive alert device includes a first component 1502 of the temperature-sensitive alert device mounted on or near a first heating device 1504. The temperature-sensitive alert device also includes a second component 1506 of the temperature-sensitive alert device mounted on or near a second heating device 1508. In this example, the first heating device 1504 is a stove or oven. The second heating device 1508 is a cooktop. However, the examples are not limited to a stove/oven and a cooktop. In other examples, the first heating device 1504 and the second heating device 1508 are implemented as a fryer, toaster, or any other type of heating device.

The first component 1502 is communicatively coupled to the second component 1506. The first component 1502 and the second component 1506 synchronize together. In some examples, the first component 1502 transmits an alert trigger to the second component 1506. When the second component 1506 receives the alert trigger, the second component 1506 generates an alert. The alert is an audible alert, a visual alert, haptic alert, or any other type of alert. For example, the second component 1506 can include one or more LED lights that light up in a flash pattern indicating the heating device 1504 and/or the heating device 1508 has been left on for a time-period which exceeds the expected time-on duration (threshold). In other examples, the alert is an audible alert, such as a beeping sound, a buzzing sound, a bell sound, an audible human voice, a musical tone, or any other type of audible alert/alarm.

In this example, the first component transmits the alert trigger to the second component. However, in other examples, the second component transmits the alert trigger to the first component.

In some examples, both the first component and the second component are capable of generating one or more different types of alerts while the other components do not generate an alert. In these examples, the component which cannot generate an alert transmits the alert trigger to the component which can generate the alert.

In still other examples, one component is capable of generating a visual alert and the second component is capable of generating an audible alert. In these examples, each component generates a different type of alert. For example, the first component generates an audible natural language alert stating a warning, such as, but not limited to, "turn oven off" or "oven still on." The second component generates a visual alert, such as a flashing light or display screen displaying a text or graphic warning, such as text stating "cooktop on" or "oven on."

In still other examples, the first component 1502 generates a first type of alert indicating the first heating device 1504 is on. The second component 1506 generates a different alert indicating the second heating device 1508 is on. For example, the first component 1502 might generate a first flash pattern of red and yellow lights while the second component generates a different flash pattern of orange and white lights indicating the second heating device is turned on. In another example, the first component generates a buzzer sound while the second component generates a sound like a bell. In this manner, the user can immediately discern which heating device is still on based on the different types of alerts generated by each component.

In other examples, if a user activates a snooze function on the temperature-sensitive alert device, the first component 1502 transmits the input data indicating the snooze function is activated to the second component 1506. The second component de-activates the alert for the delay time. In some examples, both the first component 1502 and the second component 1506 utilize the same delay time.

In other examples, the delay time for the first component 1502 is longer or shorter than the delay time implemented by the second component 1506. In this manner, the user can configure the first component 1502 for the stove to provide a different alert delay time than the second component 1506 for the cooktop. The user can customize the threshold delay time snooze function for different types of cooking devices and different types of cooking. For example, a user may want longer delay times for a pressure cooker or cooktop frequently used for slow cooking over long periods of time but a shorter delay time for an oven which is typically only used for an hour or less.

In some examples, an alert associated with the first heating device triggers activation of an alert by both the first component and the second component. In other examples, if the on-time for the first heating device triggers an alert, only the first component generates the alert. The second component only generates an alert if the second heating device exceeds the threshold time for the second heating device.

The threshold maximum on-time for the first heating device and the second heating device is the same threshold value in some examples. However, in other examples, each heating device has a separate, different device time-on maximum threshold.

In this example, the environment 1500 includes two heating devices: an oven and a cooktop. However, the examples are not limited to two heating devices. In other examples, the environment 1500 includes a single heating device, as well as three or more heating devices. For example, the environment can include a cooktop, two ovens, a fryer, a toaster oven, as well as any other types of heating devices.

Likewise, in this example, the environment includes two temperature-sensitive alert devices associated with a cooktop and an oven. In other examples, the environment includes a single temperature-sensitive alert device. In still other examples, the environment 1500 includes three or more temperature-sensitive alert devices. In these examples, the three or more temperature-sensitive alert devices are optionally communicatively coupled for synchronizing the devices.

In still other examples, the time-on maximum duration threshold is updated using the historical usage data by a machine learning model. The time-on maximum duration threshold is increased to reduce the number of snooze button activations occurring in future where the historical usage data indicates a frequency of snooze button usage exceeding an expected frequency. The expected frequency is an expected number of snooze button activations within a given time-period. The expected frequency is a user-defined value or a value generated by the machine learning model. In other examples, the expected frequency is a pre-defined default value. The expected frequency can be updated by a user, by the machine learning model or be reset to the default values by the user.

The expected frequency is a frequency at which the system expects the snooze button to be used. For example, if the expected frequency is one activation of the snooze button per day, the expected frequency is exceeded if a user activates the snooze button two or more times in a single day. In another example, the expected frequency indicates the number of snooze button activations expected during a given instance of heating device usage from activation (turn on) to de-activation (turn off) of the heating device. If the user activates the snooze button more frequently than the expected number of activations during a single instance of device usage, the system adjusts the time-on maximum duration threshold to reduce the number of alerts and thereby reduce the number of snooze button activations.

The expected frequency, in some examples, is a user-configured value. In other examples, the expected frequency is a default frequency value. In still other examples, the expected frequency is a value generated by the machine learning model based on duration of heating device usage from activation to de-activation of the device, number of alerts generated by the system during a given time-period, and/or number of snooze button activations by the user within a given time-period.

Additional Examples

In some examples, the alert device includes at least one infrared (IR) camera. The IR camera(s) enable infrared thermography to generate accurate, automated non-contact temperature measurements associated with the heating device over time. This enables more non-contact monitoring of temperatures associated with one or more heating devices over time.

In other examples, the alert device includes a thermal sensor for the stove top and a thermocouple to detect temperature changes associated with an oven. There may be a separate oven module that connects to the main unit for those cases when the oven is separate from the stove top.

In still other examples, the alert device includes a microcontroller, a snooze button, a buzzer, an LED status light, an enclosure, and connectivity options. The connectivity options can optionally include onboard low range (LoRa) radio.

Along with the oven on status, the alert device can share trend information on whether the temperatures detected are increasing or decreasing. Connection points are optionally provided for door sensors with dry contacts. Binary information can indicate when the stove is left on too long.

In an example scenario, the alert device is placed in a manner that enables it to sense the temperature of the complete stove top area, approximately twenty inches above the service. The IR sensor is mounted in a manner that provides coverage for the complete stove top. The alert device checks the temperature of the stove top area periodically to determine if it is warmer than the "on" limit. If it is determined that the oven is on, the indicator light comes on and the timer commences counting. Once the oven-on counter time is exceeded, the LED begins flashing and the buzzer sounds to alert the user that the oven may have been left on. The snooze mode is used to extend the oven-on time when needed while keeping the sensor armed to indicate that the stove/oven has been left on. If at any time the stove/oven temperature has decreased below the oven-on threshold, the device reverts to waiting (standby) mode.

In some examples, the temperature-sensitive alert device is designed with a ninety degree angle so that it points at the stove top when installed to either side of the stovetop or other surface of the heating device. This prevents the user from reaching across hot items on the stove or other heating device to press the snooze button on the device. Pressing the snooze button triggers the alert delay time as well as notifies the device that the user is aware of the alert and is attending to the heating device and/or the temperature-sensitive alert device.

In other examples, the system discontinues the alert in response to receiving input indicating user activation of the snooze button. The input can be received directly by a user pressing or otherwise activating a snooze button or other snooze controller on the alert device. In other examples, the input is received from a remote device, such as a user device or second alert device communicatively coupled to the first alert device. The input indicates user activation of an alert time delay function. In response to the input, the system temporarily de-activates the alert for the pre-defined delay time period.

Alternatively, or in addition to the other examples described herein, examples include any combination of the following:
- an alert generator that generates an alert indicating a heating device time-on duration exceeding a time-on maximum duration threshold;
- a snooze button;
- wherein the alert is de-activated for a user-configurable alert delay time in response to user activation of the snooze button, and wherein the alert is re-activated in response expiration of the user-configurable alert delay time;
- analyze historical usage data associated with the snooze button, including number of snooze button activations within a time-period, by a machine learning model;
- update the time-on maximum duration threshold using the historical usage data, wherein the time-on maximum duration threshold is increased to reduce future snooze button activations;
- a timer device that calculates the heating device time-on duration using temperature data generated by a temperature sensor;
- a communications device, wherein the communications device transmits an alert trigger to a remote alert generation device;
- the alert trigger prompts the remote alert generation device to generate the alert indicating a prediction that the heating device time-on duration has exceeded an expected duration;
- wherein the historical usage data further comprises at least one of a historical number of snooze button activations, a frequency of snooze button activations, a number of time-on maximum duration threshold value changes made by a user, and a number of user-configurable alert delay time updates made by the user;
- a first component of the temperature-sensitive alert device associated with a first heating device;
- a second component communicatively coupled to the first component, the second component removably mounted to a second heating device, wherein the second component receives data for synchronizing from the first component;
- a first communications device of the first component, wherein the first component transmits data to the second component and receives data from the second component via the first communications device;
- a second communications device of the second component, wherein the second communications device transmits data to the first component and receives data from the first component via the second communications device, wherein the first component and the second component are synchronized;
- wherein activation of the snooze button on the first component triggers deactivation of the alert on the first component and the second component;
- an LED light that generates the visual alert indicating the device-on time exceeds the time-on maximum duration threshold, the LED light emits light in at least one of a first flash pattern and a second flash pattern, wherein the first flash pattern is generated in response to the heating device time-on duration exceeding a first time-on maximum duration threshold, and wherein the second flash pattern is generated in response to the heating device time-on duration exceeding a second time-on maximum duration threshold;

monitoring a heating device to determine whether the heating device is turned on;

calculating a time-on duration of the heating device by a timer device;

predicting whether the time-on duration of the heating device exceeds an expected duration using a time-on maximum duration threshold;

generating an alert trigger by a first temperature-sensitive alert device component in response to the time-on duration exceeding the time-on maximum duration threshold, the alert trigger triggering generation of an alert by a second temperature-sensitive alert device component;

de-activating the alert for a user-configurable alert delay time in response to user activation of a snooze button, wherein the alert is re-activated in response expiration of the user-configurable alert delay time;

analyzing historical usage data associated with the activation of the snooze button, including number of snooze button activations within a time-period;

updating the time-on maximum duration threshold using the historical usage data by a machine learning model, wherein the time-on maximum duration threshold is increased to reduce the number of snooze button activations occurring in future where the historical usage data indicates a frequency of snooze button usage exceeding an expected frequency;

analyzing historical usage data associated with the snooze button, including number of snooze button activations within a time-period, by a machine learning model;

updating the user-configurable alert delay time based on the historical usage data, wherein the user-configurable alert delay time is increased to reduce the number of snooze button activations occurring in future;

monitoring the heating device time-on duration by the first temperature-sensitive alert device component using a temperature sensor;

generating an alert trigger by the first temperature-sensitive alert device component indicating that the heating device time-on duration has exceeded an expected duration;

transmitting the alert trigger to the second temperature-sensitive alert device component, wherein the second component generates the alert;

receiving the alert trigger by the second temperature-sensitive alert device component;

generating the alert by the second temperature-sensitive alert device component;

discontinuing the alert in response to receiving input indicating user activation of the snooze button;

synchronizing the first temperature-sensitive alert device component and the second temperature-sensitive alert device component at regularly scheduled time intervals, wherein the first temperature-sensitive alert device component transmits data to the second component using a first communications device;

wherein the second temperature-sensitive alert device component shares data with the first component via a second communications device of the second component;

detecting activation of the snooze button on the first temperature-sensitive alert device component;

de-activating a first alert generated by the first temperature-sensitive alert device component and deactivating a second alert generated by the second temperature-sensitive alert device component in response to the activation of the snooze button;

a first temperature-sensitive alert device component associated with a first heating device, the first temperature-sensitive alert device component monitoring a device time-on duration of the first heating device;

a second temperature-sensitive alert device component communicatively coupled to the first temperature-sensitive alert device component, the second temperature-sensitive alert device associated with a second heating device;

a first memory communicatively coupled to a first processor that executes computer-executable instructions to compare a first time-on duration of the first heating device with a first time-on maximum duration threshold;

a first alert generator generates a first alert in response to the first heating device time-on duration exceeding the first time-on maximum duration threshold;

a second memory communicatively coupled to a second processor that executes computer-executable instructions to compare a second time-on duration of the second heating device with a second time-on maximum duration threshold;

a second alert generator generates a second alert in response to the second heating device time-on duration exceeding the second time-on maximum duration threshold, wherein the second alert is a different alert than the first alert of the first temperature-sensitive alert device component;

a first LED light of the first temperature-sensitive alert device activates in response to the first heating device-on time exceeding the first time-on maximum duration threshold;

a second LED light associated with the second temperature-sensitive alert device component, the second LED light activates in response to the second heating device-on time exceeding the second time-on maximum duration threshold, wherein the second LED light flashes a second flash pattern that is different than a first flash pattern of the first LED light associated with the first temperature-sensitive alert device component;

a first snooze button associated with the first temperature-sensitive alert device component, wherein the first alert is de-activated for a first user-configurable alert delay time in response to user activation of the first snooze button, and wherein the first alert is re-activated in response expiration of the user-configurable alert delay time;

wherein activation of the first snooze button de-activates the second alert generated by the second temperature-sensitive alert device component for a second user-configured alert delay time, wherein the first user-configured alert delay time is a different time duration than the second user-configured alert delay time;

wherein activation of the first snooze button de-activates the second alert generated by the second temperature-sensitive alert device component for the first user-configured alert delay time, wherein the first alert and the second alert are de-activated for the same time duration;

a memory communicatively coupled to a processor that executes computer-executable instructions to compare a heating device time-on duration with a heating device with a time-on maximum duration threshold;

an audible alert generator that generates an audible alert in response to the heating device time-on duration exceeding the time-on maximum duration threshold;

an LED light that activates in response to the generates device-on time exceeding the time-on maximum duration threshold;

a snooze button, wherein the audible alert is de-activated for a user-configurable alert delay time in response to user activation of the snooze button, and wherein the audible alert is re-activated in response expiration of the alert delay time;

a first time-on maximum duration threshold, wherein a first audible alert is generated in response to the heating device time-on duration exceeding the first time-on maximum duration threshold;

a second time-on maximum duration threshold, wherein a second audible alert is generated in response to the heating device time-on duration exceeding the second time-on maximum duration threshold;

a first flash pattern of the LED light, wherein the first flash pattern is generated in response to the heating device time-on duration exceeding the first time-on maximum duration threshold;

a second flash pattern of the LED light, wherein the second flash pattern is generated in response to the heating device time-on duration exceeding the second time-on maximum duration threshold.

The embodiments illustrated and described herein as well as embodiments not specifically described herein but within the scope of aspects of the claims constitute an exemplary means for monitoring a heating device to determine whether the heating device is turned on, exemplary means for calculating a time-on duration of the heating device by a timer device, exemplary means for predicting whether the time-on duration of the heating device exceeds an expected duration using a time-on maximum duration threshold, exemplary means for generating an alert trigger by a first temperature-sensitive alert device component in response to the time-on duration exceeding the time-on maximum duration threshold, the alert trigger triggering generation of an alert by a second temperature-sensitive alert device component, and exemplary means for de-activating the alert for a user-configurable alert delay time in response to user activation of a snooze button, wherein the alert is re-activated in response expiration of the user-configurable alert delay time.

At least a portion of the functionality of the various elements in FIG. 1, FIG. 2, FIG. 3, FIG. 4, FIG. 5, FIG. 6, FIG. 7, and FIG. 8 can be performed by other elements in FIG. 1, FIG. 2, FIG. 3, FIG. 4, FIG. 5, FIG. 6, FIG. 7, and FIG. 8, or an entity (e.g., processor, web service, server, application program, computing device, etc.) not shown in FIG. 1, FIG. 2, FIG. 3, FIG. 4, FIG. 5, FIG. 6, FIG. 7, and FIG. 8.

In some examples, the operations illustrated in FIG. 9, FIG. 10 and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "Bluetooth®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A temperature-sensitive alert device comprising:
   an alert generator that generates an alert indicating a heating device time-on duration exceeding a time-on maximum duration threshold;
   a snooze button, wherein the alert is de-activated for a user-configurable alert delay time in response to user activation of the snooze button, and wherein the alert is re-activated in response to expiration of the user-configurable alert delay time; and
   a memory communicatively coupled to a processor that executes computer-executable instructions to:
      analyze historical usage data associated with the snooze button, including number of snooze button activations within a time-period, by a machine learning model; and
      update the time-on maximum duration threshold using the historical usage data, wherein the time-on maximum duration threshold is increased to reduce future snooze button activations.

2. The temperature-sensitive alert device of claim 1, further comprising:
   a timer device that calculates the heating device time-on duration using temperature data generated by a temperature sensor; and
   a communications device associated with a first component of the temperature-sensitive alert device, wherein the communications device transmits an alert trigger to a second component of the temperature-sensitive alert device, the alert trigger prompts the second component to generate the alert, the alert indicating a prediction that the heating device time-on duration has exceeded an expected duration.

3. The temperature-sensitive alert device of claim 1, wherein the historical usage data further comprises at least one of a historical number of snooze button activations, a frequency of snooze button activations, a number of time-on maximum duration threshold value changes made by a user, and a number of user-configurable alert delay time updates made by the user.

4. The temperature-sensitive alert device of claim 1, further comprising:
a first heating device monitored by the temperature-sensitive alert device; and
a second heating device monitored by a second temperature-sensitive alert device, wherein the second temperature-sensitive alert device is removably mounted to the second heating device, and wherein the temperature-sensitive alert device is communicatively coupled to the second temperature-sensitive alert device.

5. The temperature-sensitive alert device of claim 4, further comprising:
a first communications device that transmits data to from a first component of the temperature-sensitive alert device to a second component of the temperature-sensitive alert device, and wherein the first communications device receives data from the second component of the temperature-sensitive alert device; and
a second communications device of the second component of the temperature-sensitive alert device, wherein the second communications device transmits data to the first component of the temperature-sensitive alert device and receives data from the first component of the temperature-sensitive alert device via the second communications device during synchronization of the first component and the second component.

6. The temperature-sensitive alert device of claim 5, wherein activation of the snooze button on the temperature-sensitive alert device triggers deactivation of the alert on the second temperature-sensitive alert device.

7. The temperature-sensitive alert device of claim 1, wherein the alert is a visible alert, and further comprising:
an LED light that generates a visual alert indicating the heating device time-on duration exceeds the time-on maximum duration threshold, the LED light emits light in at least one of a first flash pattern and a second flash pattern, wherein the first flash pattern is generated in response to the heating device time-on duration exceeding a first time-on maximum duration threshold, and wherein the second flash pattern is generated in response to the heating device time-on duration exceeding a second time-on maximum duration threshold.

8. A method for generating temperature-sensitive alerts, the method comprising:
monitoring a heating device to determine whether the heating device is turned on;
calculating a time-on duration of the heating device by a timer device;
predicting whether the time-on duration of the heating device exceeds an expected duration using a time-on maximum duration threshold;
generating an alert trigger by a first temperature-sensitive alert device component in response to the time-on duration exceeding the time-on maximum duration threshold, the alert trigger triggering generation of an alert by a second temperature-sensitive alert device component;
de-activating the alert for a user-configurable alert delay time in response to user activation of a snooze button, wherein the alert is re-activated in response expiration of the user-configurable alert delay time;
analyzing historical usage data associated with the activation of the snooze button, including a number of snooze button activations within a time-period; and
updating the time-on maximum duration threshold using the historical usage data by a machine learning model, wherein the time-on maximum duration threshold is increased to reduce the number of snooze button activations occurring in future where the historical usage data indicates a frequency of snooze button usage exceeding an expected frequency.

9. The method of claim 8, wherein the first temperature-sensitive alert device component and the second temperature-sensitive alert device component are components of a single temperature-sensitive alert device.

10. The method of claim 8, further comprising:
updating the user-configurable alert delay time based on the historical usage data, wherein the user-configurable alert delay time is increased to reduce the number of snooze button activations occurring in future.

11. The method of claim 8, further comprising:
monitoring the heating device time-on duration by the first temperature-sensitive alert device component using a temperature sensor;
generating the alert trigger by the first temperature-sensitive alert device component indicating that the heating device time-on duration has exceeded an expected duration; and
transmitting the alert trigger to the second temperature-sensitive alert device component, wherein the second temperature-sensitive alert device component generates the alert.

12. The method of claim 8, further comprising:
receiving the alert trigger by the second temperature-sensitive alert device component;
generating the alert by the second temperature-sensitive alert device component; and
discontinuing the alert in response to receiving input indicating the user activation of the snooze button.

13. The method of claim 8, further comprising:
synchronizing the first temperature-sensitive alert device component and the second temperature-sensitive alert device component at regularly scheduled time intervals, wherein the first temperature-sensitive alert device component transmits data to the second temperature-sensitive alert device component using a first communications device and wherein the second temperature-sensitive alert device component shares data with the first temperature-sensitive alert device component via a second communications device of the second temperature-sensitive alert device component.

14. The method of claim 8, further comprising:
detecting activation of the snooze button on the first temperature-sensitive alert device component; and
de-activating a first alert generated by the first temperature-sensitive alert device component and deactivating a second alert generated by the second temperature-sensitive alert device component in response to the activation of the snooze button.

15. A system for temperature-sensitive alert generation, the system comprising:
a first temperature-sensitive alert device component associated with a first heating device, the first temperature-sensitive alert device component monitoring a device time-on duration of the first heating device; and a second temperature-sensitive alert device component communicatively coupled to the first temperature-sensitive alert device component, the second temperature-sensitive alert device component associated with a second heating device, wherein the first temperature-sensitive alert device component further comprises:

a first memory communicatively coupled to a first processor that executes computer-executable instructions to compare a first time-on duration of the first heating device with a first time-on maximum duration threshold; and a first alert generator generates a first alert in response to the first heating device time-on duration exceeding the first time-on maximum duration threshold;

wherein the second temperature-sensitive alert device component further comprises:

a second memory communicatively coupled to a second processor that executes computer-executable instructions to compare a second time-on duration of the second heating device with a second time-on maximum duration threshold; and a second alert generator generates a second alert in response to the second heating device time-on duration exceeding the second time-on maximum duration threshold, wherein the second alert is a different alert than the first alert of the first temperature-sensitive alert device component.

16. The system of claim 15, wherein the first temperature-sensitive alert device component synchronizes with the second temperature-sensitive alert device component at a synchronization time interval, the synchronization time interval varying depending on whether one or more of the first heating device and the second heating device is in operation.

17. The system of claim 15, wherein the first alert and the second alert are visible alerts, and further comprising:

a first LED light of the first temperature-sensitive alert device activates in response to a first heating device-on time exceeding the first time-on maximum duration threshold; and a second LED light associated with the second temperature-sensitive alert device component, the second LED light activates in response to a second heating device-on time exceeding the second time-on maximum duration threshold, wherein the second LED light flashes a second flash pattern that is different than a first flash pattern of the first LED light associated with the first temperature-sensitive alert device component.

18. The system of claim 15, further comprising:

a first snooze button associated with the first temperature-sensitive alert device component, wherein the first alert is de-activated for a first user-configurable alert delay time in response to user activation of the first snooze button, and wherein the first alert is re-activated in response to expiration of the first user-configurable alert delay time.

19. The system of claim 18, wherein activation of the first snooze button de-activates the second alert generated by the second temperature-sensitive alert device component for a second user-configured alert delay time, wherein the first user-configured alert delay time is a different time duration than the second user-configured alert delay time.

20. The system of claim 18, wherein activation of the first snooze button de-activates the second alert generated by the second temperature-sensitive alert device component for the first user-configured alert delay time, wherein the first alert and the second alert are de-activated for the same time duration.

* * * * *